(12) United States Patent
Forbes, Jr.

(10) Patent No.: US 8,700,187 B2
(45) Date of Patent: Apr. 15, 2014

(54) METHOD AND APPARATUS FOR ACTIVELY MANAGING CONSUMPTION OF ELECTRIC POWER SUPPLIED BY ONE OR MORE ELECTRIC UTILITIES

(75) Inventor: Joseph W. Forbes, Jr., Wake Forest, NC (US)

(73) Assignee: Consert Inc., San Antonio, TX (US)

( * ) Notice: Subject to any disclaimer, the term of this patent is extended or adjusted under 35 U.S.C. 154(b) by 590 days.

(21) Appl. No.: 13/050,595

(22) Filed: Mar. 17, 2011

(65) Prior Publication Data

US 2011/0172841 A1 Jul. 14, 2011

Related U.S. Application Data

(60) Continuation-in-part of application No. 12/715,124, filed on Mar. 1, 2010, now Pat. No. 8,010,812, which is
(Continued)

(51) Int. Cl.
*G05B 11/01* (2006.01)
*G05D 3/12* (2006.01)
*G05D 5/00* (2006.01)
*G05D 9/00* (2006.01)
*G05D 11/00* (2006.01)
*G05D 17/00* (2006.01)
*G01R 21/00* (2006.01)
*G01R 21/06* (2006.01)
*G05F 5/00* (2006.01)
*G05F 3/00* (2006.01)
*G05F 3/02* (2006.01)
*G05F 1/00* (2006.01)

(52) U.S. Cl.
USPC ............. 700/22; 700/286; 700/291; 700/295; 700/297; 702/60; 702/61; 702/62; 323/299; 323/304; 323/318; 713/300; 713/310; 713/320; 713/340

(58) Field of Classification Search
USPC ........ 700/22, 286, 291, 295, 297; 702/60–62; 323/299, 304, 318; 713/300, 310, 320, 713/340
See application file for complete search history.

(56) References Cited

U.S. PATENT DOCUMENTS

| | | | |
|---|---|---|---|
| 3,906,242 | A | 9/1975 | Stevenson |
| 4,023,043 | A | 5/1977 | Stevenson |

(Continued)

FOREIGN PATENT DOCUMENTS

| | | |
|---|---|---|
| EP | 1729223 A2 | 12/2006 |
| JP | 2000078748 A | 3/2000 |

(Continued)

OTHER PUBLICATIONS

International Search Report and Written Opinion dated Feb. 25, 2009 issued by the Korean Intellectual Property Office as International Searching Authority in connection with related International Application No. PCT/US2008/010199 (7 pages).

(Continued)

*Primary Examiner* — Ramesh Patel
(74) *Attorney, Agent, or Firm* — Daniel C. Crilly; GrayRobinson, P.A.

(57) ABSTRACT

A system manages consumption of power supplied by at least one electric utility to multiple power consuming devices. Power flow to the power consuming devices is enabled and disabled by controllable devices controlled by one or more client devices. According to one embodiment, a group of one or more client devices to which to communicate a power control message is determined. The power control message indicates at least one of an amount of electric power to be reduced and an identification of one or more controllable devices to be instructed to disable a flow of electric power to one or more associated power consuming devices. The power control message is communicated to the determined group of client devices to initiate a power reduction event. Subsequent to initiation of the power reduction event, a determination is made that at least one controllable device has prematurely exited the power reduction event.

34 Claims, 10 Drawing Sheets

Related U.S. Application Data a division of application No. 11/895,909, filed on Aug. 28, 2007, now Pat. No. 7,715,951, application No. 13/050,595, which is a continuation-in-part of application No. 12/715,195, filed on Mar. 1, 2010, now Pat. No. 8,032,233, which is a division of application No. 11/895,909, application No. 13/050,595, which is a continuation-in-part of application No. 12/783,415, filed on May 19, 2010, now abandoned, which is a continuation-in-part of application No. 12/715,124, and a continuation-in-part of application No. 12/001,819, filed on Dec. 13, 2007.

(56) References Cited

U.S. PATENT DOCUMENTS

| | | |
|---|---|---|
| 4,077,061 A | 2/1978 | Johnston et al. |
| 4,589,075 A | 5/1986 | Buennagel |
| 4,799,059 A | 1/1989 | Grindahl et al. |
| 4,819,180 A | 4/1989 | Hedman et al. |
| 4,819,229 A | 4/1989 | Pritty et al. |
| 5,237,507 A | 8/1993 | Chasek |
| 5,361,982 A | 11/1994 | Liebl et al. |
| 5,388,101 A | 2/1995 | Dinkins |
| 5,481,546 A | 1/1996 | Dinkins |
| 5,495,239 A | 2/1996 | Ouellette |
| 5,502,339 A | 3/1996 | Hartig |
| 5,544,036 A | 8/1996 | Brown, Jr. et al. |
| 5,553,094 A | 9/1996 | Johnson et al. |
| 5,570,002 A * | 10/1996 | Castleman .......... 323/283 |
| 5,592,491 A | 1/1997 | Dinkins |
| 5,640,153 A | 6/1997 | Hildebrand et al. |
| 5,644,173 A | 7/1997 | Elliason et al. |
| 5,675,503 A | 10/1997 | Moe et al. |
| 5,682,422 A | 10/1997 | Oliver |
| 5,696,695 A | 12/1997 | Ehlers et al. |
| 5,721,936 A | 2/1998 | Kikinis et al. |
| 5,748,104 A | 5/1998 | Argyroudis et al. |
| 5,926,776 A | 7/1999 | Glorioso et al. |
| 6,018,690 A * | 1/2000 | Saito et al. .......... 700/295 |
| 6,047,274 A | 4/2000 | Johnson et al. |
| 6,078,785 A | 6/2000 | Bush |
| 6,102,487 A | 8/2000 | Ovrebo |
| 6,115,676 A | 9/2000 | Rector et al. |
| 6,122,603 A | 9/2000 | Budike, Jr. |
| 6,154,859 A | 11/2000 | Norizuki et al. |
| 6,178,362 B1 | 1/2001 | Woolard et al. |
| 6,185,483 B1 | 2/2001 | Drees |
| 6,216,956 B1 | 4/2001 | Ehlers et al. |
| 6,233,327 B1 | 5/2001 | Petite |
| 6,254,009 B1 | 7/2001 | Proffitt et al. |
| 6,304,552 B1 | 10/2001 | Chapman et al. |
| 6,374,101 B1 | 4/2002 | Gelbien |
| 6,437,692 B1 | 8/2002 | Petite et al. |
| 6,519,509 B1 | 2/2003 | Nierlich et al. |
| 6,535,797 B1 * | 3/2003 | Bowles et al. .......... 700/286 |
| 6,577,962 B1 | 6/2003 | Afshari |
| 6,601,033 B1 | 7/2003 | Sowinski |
| 6,621,179 B1 | 9/2003 | Howard |
| 6,622,097 B2 | 9/2003 | Hunter |
| 6,622,925 B2 | 9/2003 | Carner et al. |
| 6,628,113 B2 | 9/2003 | Gallavan |
| 6,633,823 B2 | 10/2003 | Bartone et al. |
| 6,671,586 B2 | 12/2003 | Davis et al. |
| 6,681,154 B2 | 1/2004 | Nierlich et al. |
| 6,687,574 B2 | 2/2004 | Pietrowicz et al. |
| 6,732,055 B2 | 5/2004 | Bagepalli et al. |
| 6,778,882 B2 | 8/2004 | Spool et al. |
| 6,784,807 B2 | 8/2004 | Petite et al. |
| 6,785,592 B1 | 8/2004 | Smith et al. |
| 6,832,135 B2 * | 12/2004 | Ying .......... 700/295 |
| 6,834,811 B1 | 12/2004 | Huberman et al. |
| 6,836,737 B2 | 12/2004 | Petite et al. |
| 6,862,498 B2 | 3/2005 | Davis et al. |
| 6,865,450 B2 | 3/2005 | Masticola et al. |
| 6,868,293 B1 | 3/2005 | Schurr et al. |
| 6,879,059 B2 | 4/2005 | Sleva |
| 6,882,498 B2 | 4/2005 | Kurumatani et al. |
| 6,891,838 B1 | 5/2005 | Petite et al. |
| 6,904,336 B2 | 6/2005 | Raines et al. |
| 6,906,617 B1 | 6/2005 | Van der Meulen |
| 6,909,942 B2 | 6/2005 | Andarawis et al. |
| 6,914,533 B2 | 7/2005 | Petite |
| 6,914,893 B2 | 7/2005 | Petite |
| 6,934,316 B2 | 8/2005 | Cornwall et al. |
| 6,961,641 B1 | 11/2005 | Forth et al. |
| 6,990,593 B2 | 1/2006 | Nakagawa |
| 7,003,640 B2 | 2/2006 | Mayo et al. |
| 7,019,667 B2 | 3/2006 | Petite et al. |
| 7,035,719 B2 | 4/2006 | Howard et al. |
| 7,039,532 B2 | 5/2006 | Hunter |
| 7,051,332 B2 | 5/2006 | Gatto et al. |
| 7,053,767 B2 | 5/2006 | Petite et al. |
| 7,088,014 B2 | 8/2006 | Nierlich et al. |
| 7,089,125 B2 | 8/2006 | Sonderegger |
| 7,103,511 B2 | 9/2006 | Petite |
| 7,123,994 B2 | 10/2006 | Weik et al. |
| 7,130,719 B2 | 10/2006 | Ehlers et al. |
| 7,133,750 B2 | 11/2006 | Raines et al. |
| 7,177,728 B2 | 2/2007 | Gardner |
| 7,181,320 B2 | 2/2007 | Whiffen et al. |
| 7,184,861 B2 | 2/2007 | Petite |
| 7,200,134 B2 | 4/2007 | Proctor, Jr. et al. |
| 7,206,670 B2 | 4/2007 | Pimputkar et al. |
| 7,209,804 B2 | 4/2007 | Curt et al. |
| 7,209,840 B2 | 4/2007 | Petite et al. |
| 7,231,280 B2 | 6/2007 | Costa |
| 7,231,281 B2 | 6/2007 | Costa |
| 7,233,843 B2 | 6/2007 | Budhraja et al. |
| 7,263,073 B2 | 8/2007 | Petite et al. |
| 7,274,975 B2 | 9/2007 | Miller |
| 7,289,887 B2 | 10/2007 | Rodgers |
| 7,295,128 B2 | 11/2007 | Petite |
| 7,305,282 B2 | 12/2007 | Chen |
| 7,313,465 B1 | 12/2007 | O'Donnell |
| 7,333,880 B2 | 2/2008 | Brewster et al. |
| 7,343,341 B2 | 3/2008 | Sandor et al. |
| 7,345,998 B2 | 3/2008 | Cregg et al. |
| 7,346,463 B2 | 3/2008 | Petite et al. |
| 7,366,164 B1 | 4/2008 | Habib et al. |
| 7,397,907 B2 | 7/2008 | Petite |
| 7,406,364 B2 | 7/2008 | Andrén et al. |
| 7,412,304 B2 | 8/2008 | Uenou |
| 7,424,527 B2 | 9/2008 | Petite |
| 7,440,871 B2 | 10/2008 | McConnell et al. |
| 7,451,019 B2 | 11/2008 | Rodgers |
| 7,468,661 B2 | 12/2008 | Petite et al. |
| 7,480,501 B2 | 1/2009 | Petite |
| 7,486,681 B2 | 2/2009 | Weber |
| 7,528,503 B2 | 5/2009 | Rognli et al. |
| 7,536,240 B2 | 5/2009 | McIntyre et al. |
| 7,541,941 B2 | 6/2009 | Bogolea et al. |
| 7,565,227 B2 | 7/2009 | Richard et al. |
| 7,650,425 B2 | 1/2010 | Davis et al. |
| 7,697,492 B2 | 4/2010 | Petite |
| 7,711,796 B2 | 5/2010 | Gutt et al. |
| 7,715,951 B2 | 5/2010 | Forbes, Jr. et al. |
| 7,738,999 B2 | 6/2010 | Petite |
| 7,739,378 B2 | 6/2010 | Petite |
| 8,010,812 B2 | 8/2011 | Forbes, Jr. et al. |
| 8,032,233 B2 | 10/2011 | Forbes, Jr. et al. |
| 8,131,403 B2 | 3/2012 | Forbes, Jr. et al. |
| 8,145,361 B2 | 3/2012 | Forbes, Jr. et al. |
| 8,260,470 B2 | 9/2012 | Forbes, Jr. et al. |
| 8,307,225 B2 | 11/2012 | Forbes, Jr. et al. |
| 8,315,717 B2 | 11/2012 | Forbes, Jr. et al. |
| 8,390,221 B2 | 3/2013 | Jayanth et al. |
| 8,396,606 B2 | 3/2013 | Forbes, Jr. et al. |
| 8,527,107 B2 | 9/2013 | Forbes, Jr. et al. |
| 8,542,685 B2 | 9/2013 | Forbes, Jr. et al. |
| 2001/0025209 A1 | 9/2001 | Fukui et al. |
| 2001/0030468 A1 | 10/2001 | Anderson et al. |
| 2001/0038343 A1 | 11/2001 | Meyer et al. |
| 2002/0019802 A1 | 2/2002 | Malme et al. |

(56) References Cited

U.S. PATENT DOCUMENTS

| | | |
|---|---|---|
| 2002/0035496 A1 | 3/2002 | Fukushima et al. |
| 2002/0109607 A1 | 8/2002 | Cumeralto et al. |
| 2002/0138176 A1 | 9/2002 | Davis et al. |
| 2002/0143693 A1 | 10/2002 | Soestbergen et al. |
| 2003/0009705 A1 | 1/2003 | Thelander et al. |
| 2003/0036820 A1 | 2/2003 | Yellepeddy |
| 2003/0040844 A1 | 2/2003 | Spool et al. |
| 2003/0063723 A1 | 4/2003 | Booth et al. |
| 2003/0074304 A1 | 4/2003 | Okada |
| 2003/0083980 A1 | 5/2003 | Satake |
| 2003/0144864 A1 | 7/2003 | Mazzarella |
| 2003/0225483 A1 | 12/2003 | Santinato et al. |
| 2003/0229572 A1 | 12/2003 | Raines et al. |
| 2003/0233201 A1 | 12/2003 | Horst et al. |
| 2004/0006439 A1 | 1/2004 | Hunter |
| 2004/0088083 A1 | 5/2004 | Davis et al. |
| 2004/0095237 A1 | 5/2004 | Chen et al. |
| 2004/0117330 A1 | 6/2004 | Ehlers et al. |
| 2004/0128266 A1 | 7/2004 | Yellepeddy et al. |
| 2004/0153170 A1 | 8/2004 | Santacatterina et al. |
| 2004/0158478 A1 | 8/2004 | Zimmerman |
| 2004/0162793 A1 | 8/2004 | Scott et al. |
| 2004/0193329 A1 | 9/2004 | Ransom et al. |
| 2004/0230533 A1 | 11/2004 | Benco |
| 2005/0033481 A1* | 2/2005 | Budhraja et al. ............... 700/286 |
| 2005/0055432 A1 | 3/2005 | Rodgers |
| 2005/0065742 A1 | 3/2005 | Rodgers |
| 2005/0096856 A1 | 5/2005 | Lubkeman et al. |
| 2005/0096857 A1 | 5/2005 | Hunter |
| 2005/0116836 A1 | 6/2005 | Perry et al. |
| 2005/0125243 A1 | 6/2005 | Villalobos |
| 2005/0138432 A1 | 6/2005 | Ransom et al. |
| 2005/0192711 A1 | 9/2005 | Raines et al. |
| 2005/0192713 A1 | 9/2005 | Weik et al. |
| 2005/0216302 A1 | 9/2005 | Raji et al. |
| 2005/0216580 A1 | 9/2005 | Raji et al. |
| 2005/0234600 A1 | 10/2005 | Boucher et al. |
| 2005/0240314 A1* | 10/2005 | Martinez .................... 700/286 |
| 2005/0240315 A1* | 10/2005 | Booth et al. ................ 700/295 |
| 2005/0246190 A1 | 11/2005 | Sandor et al. |
| 2005/0267642 A1 | 12/2005 | Whiffen et al. |
| 2005/0276222 A1 | 12/2005 | Kumar et al. |
| 2006/0020544 A1 | 1/2006 | Kaveski |
| 2006/0022841 A1 | 2/2006 | Hoiness et al. |
| 2006/0025891 A1* | 2/2006 | Budike, Jr. .................. 700/275 |
| 2006/0031934 A1 | 2/2006 | Kriegel |
| 2006/0064205 A1 | 3/2006 | Ying |
| 2006/0106635 A1 | 5/2006 | Ulrich et al. |
| 2006/0142900 A1 | 6/2006 | Rothman et al. |
| 2006/0142961 A1 | 6/2006 | Johnson et al. |
| 2006/0161450 A1 | 7/2006 | Carey et al. |
| 2006/0168191 A1 | 7/2006 | Ives |
| 2006/0195334 A1 | 8/2006 | Reeb et al. |
| 2006/0259199 A1 | 11/2006 | Gjerde et al. |
| 2006/0271244 A1* | 11/2006 | Cumming et al. ............. 700/291 |
| 2006/0271314 A1* | 11/2006 | Hayes ............................ 702/62 |
| 2007/0010914 A1 | 1/2007 | Johnson et al. |
| 2007/0021874 A1 | 1/2007 | Rognli et al. |
| 2007/0025249 A1 | 2/2007 | Yeom |
| 2007/0058453 A1 | 3/2007 | Shaffer et al. |
| 2007/0058629 A1* | 3/2007 | Luft .............................. 370/390 |
| 2007/0070895 A1 | 3/2007 | Narvaez |
| 2007/0085702 A1 | 4/2007 | Walters et al. |
| 2007/0091900 A1 | 4/2007 | Asthana et al. |
| 2007/0100503 A1* | 5/2007 | Balan et al. .................. 700/286 |
| 2007/0203722 A1 | 8/2007 | Richards et al. |
| 2007/0204176 A1* | 8/2007 | Shaffer et al. ................ 713/300 |
| 2007/0205915 A1 | 9/2007 | Shuey et al. |
| 2007/0213878 A1 | 9/2007 | Chen |
| 2007/0255457 A1 | 11/2007 | Whitcomb et al. |
| 2007/0286210 A1 | 12/2007 | Gutt et al. |
| 2007/0291644 A1 | 12/2007 | Roberts et al. |
| 2007/0299562 A1 | 12/2007 | Kates |
| 2008/0015975 A1 | 1/2008 | Ivchenko et al. |
| 2008/0015976 A1 | 1/2008 | Sandor et al. |
| 2008/0091625 A1 | 4/2008 | Kremen |
| 2008/0130673 A1 | 6/2008 | Cregg et al. |
| 2008/0147465 A1 | 6/2008 | Raines et al. |
| 2008/0165714 A1 | 7/2008 | Dettinger et al. |
| 2008/0172312 A1 | 7/2008 | Synesiou et al. |
| 2008/0177423 A1 | 7/2008 | Brickfield et al. |
| 2008/0177678 A1 | 7/2008 | Di Martini |
| 2008/0183523 A1 | 7/2008 | Dikeman |
| 2008/0201255 A1 | 8/2008 | Green |
| 2008/0224892 A1 | 9/2008 | Bogolea et al. |
| 2008/0228630 A1 | 9/2008 | Gotthelf et al. |
| 2008/0231114 A1 | 9/2008 | Tolnar et al. |
| 2008/0238710 A1 | 10/2008 | Tolnar et al. |
| 2008/0255899 A1 | 10/2008 | McConnell et al. |
| 2008/0275815 A1 | 11/2008 | Musier et al. |
| 2008/0281473 A1 | 11/2008 | Pitt |
| 2009/0018884 A1 | 1/2009 | McConnell et al. |
| 2009/0043519 A1 | 2/2009 | Bridges et al. |
| 2009/0043520 A1* | 2/2009 | Pollack et al. ................... 702/62 |
| 2009/0055031 A1 | 2/2009 | Slota et al. |
| 2009/0062970 A1 | 3/2009 | Forbes, Jr. et al. |
| 2009/0063122 A1 | 3/2009 | Nasle |
| 2009/0063228 A1 | 3/2009 | Forbes, Jr. et al. |
| 2009/0088991 A1 | 4/2009 | Brzezowski et al. |
| 2009/0106571 A1 | 4/2009 | Low et al. |
| 2009/0112758 A1 | 4/2009 | Herzig |
| 2009/0135836 A1 | 5/2009 | Veillette |
| 2009/0157510 A1 | 6/2009 | Pridmore et al. |
| 2009/0171975 A1 | 7/2009 | McConnell et al. |
| 2009/0177505 A1 | 7/2009 | Dietrich et al. |
| 2009/0184689 A1 | 7/2009 | Kressner et al. |
| 2009/0187499 A1* | 7/2009 | Mulder et al. .................. 705/30 |
| 2009/0192894 A1 | 7/2009 | Dikeman |
| 2009/0210295 A1 | 8/2009 | Edholm et al. |
| 2009/0228320 A1 | 9/2009 | Lopez et al. |
| 2009/0228406 A1 | 9/2009 | Lopez et al. |
| 2009/0240381 A1* | 9/2009 | Lane ............................ 700/296 |
| 2009/0265568 A1 | 10/2009 | Jackson |
| 2009/0313033 A1 | 12/2009 | Hafner et al. |
| 2009/0319091 A1 | 12/2009 | Flohr |
| 2010/0023376 A1 | 1/2010 | Brown |
| 2010/0042420 A1 | 2/2010 | Hutchinson |
| 2010/0063832 A1 | 3/2010 | Brown |
| 2010/0076825 A1 | 3/2010 | Sato et al. |
| 2010/0106575 A1 | 4/2010 | Bixby et al. |
| 2010/0145534 A1 | 6/2010 | Forbes, Jr. et al. |
| 2010/0161148 A1 | 6/2010 | Forbes, Jr. et al. |
| 2010/0179670 A1 | 7/2010 | Forbes, Jr. et al. |
| 2010/0191862 A1 | 7/2010 | Forbes, Jr. et al. |
| 2010/0198713 A1 | 8/2010 | Forbes, Jr. et al. |
| 2010/0218010 A1 | 8/2010 | Musti et al. |
| 2010/0222935 A1 | 9/2010 | Forbes, Jr. et al. |
| 2010/0228601 A1 | 9/2010 | Vaswani et al. |
| 2010/0228861 A1 | 9/2010 | Arsovski et al. |
| 2010/0235008 A1 | 9/2010 | Forbes, Jr. et al. |
| 2010/0254290 A1 | 10/2010 | Gong et al. |
| 2011/0022239 A1 | 1/2011 | Forbes, Jr. |
| 2011/0029655 A1 | 2/2011 | Forbes, Jr. |
| 2011/0061014 A1 | 3/2011 | Frader-Thompson et al. |
| 2011/0063126 A1 | 3/2011 | Kennedy et al. |
| 2011/0082598 A1 | 4/2011 | Boretto et al. |
| 2011/0115302 A1 | 5/2011 | Slota et al. |
| 2011/0125422 A1 | 5/2011 | Goncalves Jota et al. |
| 2011/0133655 A1 | 6/2011 | Recker et al. |
| 2011/0144819 A1 | 6/2011 | Andrews et al. |
| 2011/0172837 A1 | 7/2011 | Forbes, Jr. |
| 2011/0172841 A1 | 7/2011 | Forbes, Jr. |
| 2011/0196546 A1 | 8/2011 | Muller et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0257809 A1 | 10/2011 | Forbes, Jr. et al. |
| 2011/0258022 A1 | 10/2011 | Forbes, Jr. et al. |
| 2012/0101932 A1 | 4/2012 | Slutsker et al. |

(56) References Cited

U.S. PATENT DOCUMENTS

| | | | |
|---|---|---|---|
| 2013/0120881 | A1 | 5/2013 | Jayanth et al. |
| 2013/0184888 | A1 | 7/2013 | Forbes, Jr. et al. |

FOREIGN PATENT DOCUMENTS

| | | | |
|---|---|---|---|
| JP | 2001008380 | A | 1/2001 |
| JP | 2001306839 | | 11/2001 |
| JP | 2002133568 | A | 5/2002 |
| JP | 2002176729 | | 6/2002 |
| JP | 2002281666 | | 9/2002 |
| JP | 2003067457 | | 3/2003 |
| JP | 2004248174 | A | 2/2004 |
| JP | 2004112868 | | 4/2004 |
| JP | 2004180412 | | 6/2004 |
| JP | 2004301505 | A | 10/2004 |
| JP | 2006060911 | A | 3/2006 |
| JP | 2006277597 | | 10/2006 |
| JP | 2007132553 | A | 5/2007 |
| JP | 2010081722 | A | 4/2010 |
| JP | 2010119269 | A | 5/2010 |
| JP | 2010183760 | A | 8/2010 |
| KR | 2005001584 | A | 1/2005 |
| KR | 20050045272 | A | 5/2005 |
| KR | 20060036171 | A | 4/2006 |
| KR | 20070008321 | A | 1/2007 |
| KR | 100701298 | B1 | 3/2007 |
| KR | 20070098172 | A | 10/2007 |
| KR | 20080112692 | A | 12/2008 |
| KR | 10-1277398 | | 6/2013 |
| WO | 2005029243 | A2 | 3/2005 |
| WO | 2007136456 | A2 | 11/2007 |
| WO | 2008125696 | A2 | 10/2008 |
| WO | 2009032161 | A2 | 3/2009 |
| WO | 2009032162 | A2 | 3/2009 |
| WO | 2010129059 | A1 | 11/2010 |
| WO | 2010129958 | A2 | 11/2010 |
| WO | 2010132456 | A2 | 11/2010 |
| WO | 2010132469 | A2 | 11/2010 |
| WO | 2010132477 | A2 | 11/2010 |
| WO | 2010134987 | A1 | 11/2010 |
| WO | 2011043818 | A2 | 4/2011 |
| WO | 2011046589 | A1 | 4/2011 |
| WO | 2012106431 | A1 | 8/2012 |
| WO | 2012145102 | A2 | 10/2012 |

OTHER PUBLICATIONS

Office Action dated Jul. 17, 2009, as entered in grandparent U.S. Appl. No. 11/895,909 (11 pages).
Amendment and Response dated Oct. 15, 2009, as filed in grandparent U.S. Appl. No. 11/895,909 (14 pages).
Notice of Allowability dated Dec. 23, 2009, as entered in grandparent U.S. Appl. No. 11/895,909 (4 pages).
Office Action dated May 19, 2010, as entered in parent U.S. Appl. No. 12/715,195 (10 pages).
Amendment and Response dated Jul. 19, 2010 as filed in parent U.S. Appl. No. 12/715,195 (20 pages).
International Search Report and Written Opinion dated Mar. 6, 2009 issued by the Korean Intellectual Property Office as International Searching Authority in connection with related International Application No. PCT/US2008/010200 (9 pages).
International Search Report and Written Opinion dated Jul. 15, 2010 issued by the United States Patent and Trademark Office as International Searching Authority in connection with related International Application No. PCT/US10/01354 (10 pages).
International Search Report and Written Opinion dated Jul. 23, 2010 issued by the United States Patent and Trademark Office as International Searching Authority in connection with related International Application No. PCT/US10/01489 (11 pages).
Michael Ahlheim and Friedrich Schneider, Allowing for Household Preferences in Emission Trading, A Contribution to the Climate Policy Debate, Environmental and Resource Economics, vol. 21, pp. 317-342, 2002 Kluwer Academic Publishers, Printed in the Netherlands (26 pages).
Olivier Rousse, Environmental and economic benefits resulting from citizens' participation in CO2 emissions trading: An efficient alternative solution to the voluntary compensation of CO2 emissions, Energy Policy 36 (2008), pp. 388-397 (10 pages).
Notice of Allowability dated Aug. 31, 2010, as entered in parent U.S. Appl. No. 12/715,124 (5 pages).
Notice of Allowability dated Sep. 8, 2010, as entered in parent U.S. Appl. No. 12/715,195 (4 pages).
B.J. Kirby, Spinning Reserve from Responsive Loads, Oak Ridge National Laboratory, United States Dept. of Energy, Mar. 2003 (54 pages).
Eric Hirst and Brendan Kirby, Opportunities for Demand Participation in New England Contingency-Reserve Markets, New England Demand Response Initiative, Feb. 2003 (15 pages).
Paul Darbee, Insteon The Details, Smarthouse, Inc., Aug. 11, 2005, 68 pages.
Paul Darbee, Insteon Compared, SmartLabs, Inc., Jan. 2, 2006, 69 pages.
International Search Report and Written Opinion dated May 31, 2011 issued by the Korean Intellectual Property Office as International Searching Authority in connection with related International Application No. PCT/US2010/002709 (7 pages).
Amendment and Response dated May 7, 2012, as filed in related U.S. Appl. No. 13/172,261 (30 pages).
Amendment and Response dated Apr. 2, 2012, as filed in related U.S. Appl. No. 12/702,768 (12 pages).
U.S. Patent and Trademark Office; Notice of Allowability dated May 2, 2012, as entered in related U.S. Appl. No. 12/702,768 (7 pages).
Amendment and Response dated May 7, 2012, as filed in related U.S. Appl. No. 13/172,389 (15 pages).
U.S. Patent and Trademark Office; Office Action dated Jun. 1, 2012, as entered in related U.S. Appl. No. 12/775,979 (6 pages).
Response to Examination Report dated Jun. 5, 2012, as filed in related Australian Patent Application No. 2008296979 (33 pages).
European Patent Office, Extended European Search Report (including Supplementary European Search Report and European Search Opinion) dated May 29, 2012, as issued in connection with related European Patent Application No. 08795673.6 (7 pages).
European Patent Office, Extended European Search Report (including Supplementary European Search Report and European Search Opinion) dated Jun. 1, 2012, as issued in connection with related European Patent Application No. 08795674.4 (6 pages).
U.S. Patent and Trademark Office; Notice of Allowability dated Jun. 5, 2012, as entered in related U.S. Appl. No. 13/172,261 (4 pages).
U.S. Patent and Trademark Office; Office Action dated May 18, 2012, as entered in related U.S. Appl. No. 12/001,819 (21 pages).
Mexican Institute of Industrial Property, Official Action dated Jan. 31, 2013, as entered in related Mexican Application No. MX/a/2012/000854 (2 pages).
Japanese Patent Office, Decision of Rejection dated Feb. 5, 2013, as entered in related Japanese Application No. 2010-522953 (3 pages).
Korean Intellectual Property Office, Notification of Provisional Rejection dated Apr. 19, 2013, as entered in related Korean Application No. 10-2012-7012538 (3 pages).
The Patent Office of the People's Republic of China; Notification of the Third Office Action dated Jun. 9, 2013, as entered in related Chinese Application No. 200880113529.7 (7 pages).
Amendment, Response and Argument dated Jul. 13, 2013, as filed in related Japanese Patent Application No. 2010-522953 (17 pages).
Korean Intellectual Property Office, Notification of Provisional Rejection dated Aug. 8, 2013, as entered in related Korean Application No. 10-2011-7029409 (4 pages).
European Patent Office, Extended European Search Report (including Supplementary European Search Report and European Search Opinion) dated Jul. 31, 2013, as issued in connection with related European Patent Application No. 10822357.9 (9 pages).
Canadian Intellectual Property Office, Office Action dated Apr. 4, 2013, as entered in related Canadian Application No. 2,698,348 (3 pages).
International Search Report and Written Opinion dated Jun. 22, 2012 issued by the Korean Intellectual Property Office as International Searching Authority in connection with related International Application No. PCT/US2012/023488 (8 pages).

(56) References Cited

OTHER PUBLICATIONS

Patent Examination Report No. 3 dated Jul. 6, 2012 from the Australian Patent Office (Australian Government IP Australia) in connection with related Australian Application No. 2008296979 (4 pages).
Decision of Rejection issued Jul. 31, 2012 by the Japanese Patent Office in connection with related Japanese Application No. 2010-522953 (2 pages).
Amendment and Response dated Sep. 4, 2012, as filed in related U.S. Appl. No. 12/775,979 (7 pages).
Amendment and Response dated Sep. 10, 2012, as filed in related U.S. Appl. No. 12/783,415 (40 pages).
U.S. Patent and Trademark Office; Office Action dated Sep. 13, 2011 as entered in related U.S. Appl. No. 12/001,819 (18 pages).
International Search Report and Written Opinion dated Oct. 30, 2012 issued by the Korean Intellectual Property Office as International Searching Authority in connection with counterpart International Application No. PCT/US2012/029339 (13 pages).
Korean Intellectual Property Office, Second Notification of Provisional Rejection dated Oct. 31, 2012, as entered in related Korean Application No. 10-2010-7006801 (5 pages).
The Patent Office of the People's Republic of China; Notification of the Second Office Action dated Oct. 29, 2012, as entered in related Chinese Application No. 200880113530.X (9 pages).
Mexican Institute of Industrial Property, Official Action dated Nov. 9, 2012, as entered in related Mexican Application No. MX/a/2011/011824 (2 pages).
Korean Intellectual Property Office, Notification of Provisional Rejection dated Nov. 23, 2012, as entered in related Korean Application No. 10-2011-7029409 (3 pages).
The Patent Office of the People's Republic of China; Notification of the Second Office Action dated Oct. 26, 2012, as entered in related Chinese Application No. 200880113529.7 (7 pages).
Korean Intellectual Property Office, Second Notification of Provisional Rejection dated Oct. 22, 2012, as entered in related Korean Application No. 10-2012-7001804 (1 page).
Korean Intellectual Property Office, Notification of Provisional Rejection dated Dec. 14, 2012, as entered in related Korean Application No. 10-2011-7030546 (2 pages).
U.S. Patent and Trademark Office; Final Office Action dated Jan. 4, 2013, as entered in related U.S. Appl. No. 12/783,415 (39 pages).
U.S. Patent and Trademark Office; Office Action dated Jan. 3, 2012, as entered in related U.S. Appl. No. 12/702,768 (9 pages).
U.S. Patent and Trademark Office; Office Action dated Feb. 6, 2012, as entered in related U.S. Appl. No. 13/172,389 (9 pages).
U.S. Patent and Trademark Office; Notice of Allowability dated Jan. 25, 2012, as entered in related U.S. Appl. No. 12/702,640 (11 pages).
U.S. Patent and Trademark Office; Notice of Allowability dated Feb. 10, 2012, as entered in related U.S. Appl. No. 12/702,785 (10 pages).
U.S. Patent and Trademark Office; Office Action dated Mar. 9, 2012, as entered in related U.S. Appl. No. 12/783,415 (36 pages).
Amendment and Response dated Mar. 13, 2012 as filed in related U.S. Appl. No. 12/001,819 (21 pages).
The Patent Office of the People's Republic of China; Notification of the First Office Action dated Oct. 17, 2011, as entered in related Chinese Application No. 200880113530.X (9 pages).
The Patent Office of the People's Republic of China; Notification of the First Office Action dated Oct. 17, 2011, as entered in related Chinese Application No. 200880113529.7 (11 pages).

U.S. Patent and Trademark Office; Office Action dated Dec. 15, 2011, as entered in related U.S. Appl. No. 13/172,261 (8 pages).
Japanese Patent Office; Notification of First Office Action dated Mar. 21, 2012, as entered in related Japanese Application No. 2010522954 (10 pages).
Pablo A. Ruiz and Peter W. Sauer, Valuation of Reserve Services, IEEE Proceedings of the 41st Hawaii International Conference on System Sciences, 2008 (9 pages).
Eric Hirst and Richard Cowart, Demand Side Resources and Reliability, New England Demand Response Initiative, Mar. 20, 2002 (32 pages).
C.W. Gellings and W.M. Smith, Integrating Demand-Side Management into Utility Planning, Proceedings of the IEEE, vol. 77, Issue: 6, Jun. 1989, pp. 908-918 (Abstract only).
M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).
L.T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).
Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).
Kathleen Spees and Lester B. Lave, Demand Response and Electricity Market Efficiency, The Electricity Journal, vol. 20, Issue 3, Apr. 2007 (online Mar. 27, 2007), pp. 69-85 (Abstract only).
International Search Report and Written Opinion dated Nov. 30, 2010 issued by the Korean Intellectual Property Office as International Searching Authority in connection with related International Application No. PCT/US2010/034395 (8 pages).
International Search Report and Written Opinion dated Dec. 20, 2010 issued by the United States Patent and Trademark Office as International Searching Authority in connection with related International Application No. PCT/US10/02676 (20 pages).
International Search Report and Written Opinion dated Dec. 21, 2010 issued by the Korean Intellectual Property Office as International Searching Authority in connection with related International Application No. PCT/US2010/034247 (3 pages).
International Search Report and Written Opinion dated Dec. 22, 2010 issued by the Korean Intellectual Property Office as International Searching Authority in connection with related International Application No. PCT/US2010/034409 (4 pages).
International Search Report and Written Opinion dated Dec. 22, 2010 issued by the Korean Intellectual Property Office as International Searching Authority in connection with related International Application No. PCT/US2010/034418 (4 pages).
Office Action dated Jan. 7, 2011 as issued by the Australian Patent Office (Australian Government IP Australia) in connection with related Australian Application No. 2008296979 (2 pages).
Mashiro Inoue, Toshiyasu Higuma, Yoshiaki Ito, Noriyuki Kushiro and Hitoshi Kubota, Network Architecture for Home Energy Management System, IEEE Transactions on Consumer Electronics, vol. 49, Issue 3, Aug. 2003, pp. 606-613 (8 pages).

* cited by examiner

METHOD AND APPARATUS FOR ACTIVELY MANAGING CONSUMPTION OF ELECTRIC POWER SUPPLIED BY ONE OR MORE ELECTRIC UTILITIES

CROSS REFERENCE TO RELATED APPLICATIONS

This application is a continuation-in-part of U.S. application Ser. No. 12/715,124 filed on Mar. 1, 2010 now U.S. Pat. No. 8,010,812, which is a division of U.S. application Ser. No. 11/895,909 filed on Aug. 28, 2007, now U.S. Pat. No. 7,715,951, and is incorporated herein by this reference. This application is also a continuation-in-part of U.S. application Ser. No. 12/715,195 filed on Mar. 1, 2010 now U.S. Pat. No. 8,032,233, which is a division of U.S. application Ser. No. 11/895,909 filed on Aug. 28, 2007, now U.S. Pat. No. 7,715, 951, and is incorporated herein by this reference. This application is further a continuation-in-part of U.S. application Ser. No. 12/783,415 filed on May 19, 2010 now abandoned, which is a continuation-in-part of U.S. application Ser. No. 12/715,124 filed on Mar. 1, 2010 and a continuation-in-part of co-pending U.S. application Ser. No. 12/001,819 filed on Dec. 13, 2007, and is incorporated herein by this reference. Finally, this application is related to U.S. application Ser. No. 12/702,640, U.S. application Ser. No. 12/775,979, U.S. application Ser. No. 12/896,307, and U.S. application Ser. No. 12/900,884, all of which are incorporated herein by this reference.

BACKGROUND OF THE INVENTION

1. Field of the Invention

The present invention relates generally to the field of electrical power load control systems and more particularly to a method and system for actively controlling power load management for individual customers and optionally tracking power savings for both the individual customer as well as the overall electric utility.

2. Description of Related Art

The increased awareness of the impact of carbon emissions from the use of fossil fueled electric generation combined with the increased cost of producing peak power during high load conditions has increased the need for alternative solutions utilizing load control as a mechanism to defer, or in some cases eliminate, the need for the deployment of additional generation capacity by electric utilities. Existing electric utilities are pressed for methods to defer or eliminate the need for construction of fossil-based electricity generation. Today, a patchwork of systems exist to implement demand response load management programs, whereby various radio subsystems in various frequency bands utilize "one-way" transmit only methods of communication. Under these programs, RF controlled relay switches are typically attached to a customer's air conditioner, water heater, or pool pump. A blanket command is sent out to a specific geographic area whereby all receiving units within the range of the transmitting station (e.g., typically a paging network) are turned off during peak hours at the election of the power utility. After a period of time when the peak load has passed, a second blanket command is sent to turn on those devices that have been turned off.

While tele-metering has been used for the express purpose of reporting energy usage, no techniques exist for calculating power consumption and/or gaseous emissions (e.g., carbon gas emissions, sulfur dioxide ($SO_2$) gas emissions, and/or nitrogen dioxide ($NO_2$) emissions), and reporting the state of a particular device under the control of a two-way positive load control management device. In particular, one way wireless communications devices have been utilized to de-activate electrical appliances, such as heating, ventilation, and air-conditioning (HVAC) units, water heaters, pool pumps, and lighting, from an existing electrical supplier or distribution partner's network. These devices have typically been used in combination with wireless paging receivers that receive "on" or "off" commands from a paging transmitter. Additionally, the one-way devices are typically connected to a serving electrical supplier's control center via landline trunks, or in some cases, microwave transmission to the paging transmitter. The customer subscribing to the load management program receives a discount for allowing the serving electrical supplier (utility) to connect to their electrical appliances and deactivate those appliances during high energy usage periods.

While one-way devices are generally industry standard and relatively inexpensive to implement, the lack of a return path from the receiver, combined with the lack of information on the actual devices connected to the receiver, make the system highly inefficient for measuring the actual load shed to the serving utility. While the differential current draw is measurable on the serving electric utility's transmission lines, the actual load shed is approximate and the location of the load deferral or curtailment is approximated at the control center of the serving utility.

One exemplary tele-metering system is disclosed in U.S. Pat. No. 6,891,838 B1. This patent describes details surrounding a mesh communication of residential devices and the reporting and control of those devices, via WANs, to a computer. The stated design goal in this patent is to facilitate the "monitoring and control of residential automation systems." This patent does not explain how a serving utility or customer could actively control the devices to facilitate a reduction of electricity. Instead, this patent discloses techniques that could be utilized for reporting information that is being displayed by the serving utility's power meter (as do many other prior applications in the field of tele-metering).

An additional exemplary tele-metering system is disclosed in U.S. Patent Application Publication No. 2005/0240315 A1. The primary purpose of this published application is not to control utility loads, but rather "to provide an improved interactive system for remotely monitoring and establishing the status of a customer utility load." A stated goal of this publication is to reduce the amount of time utility field personnel have to spend in the field servicing meters by utilizing wireless technology.

Another prior art system is disclosed in U.S. Pat. No. 6,633,823 B2, which describes, in detail, the use of proprietary hardware to remotely turn off or turn on devices within a building or residence. While initially this prior art generally describes a system that would assist utilities in managing power load control, the prior art does not contain the unique attributes necessary to construct or implement a complete system. In particular, this patent is deficient in the areas of security, load accuracy of a controlled device, and methods disclosing how a customer utilizing applicable hardware might set parameters, such as temperature set points, customer preference information, and customer overrides, within an intelligent algorithm that reduces the probability of customer dissatisfaction and service cancellation or churn.

Attempts have been made to bridge the gap between one-way, un-verified power load control management systems and positive control verified power load control management systems. However, until recently, technologies such as smart breakers and command relay devices were not considered for use in residential and commercial environments primarily due to high cost entry points, lack of customer demand, and the cost of power generation relative to the cost of implementing load control.

One such gap-bridging attempt is described in U.S. Patent Application Publication No. US 2005/0065742 A1. This publication discloses a system and method for remote power management using IEEE 802 based wireless communication links. The system disclosed in this publication includes an on-premise processor (OPP), a host processor, and an end device. The host processor issues power management commands to the OPP, which in turn relays the commands to the end devices under its management. While the disclosed OPP does provide some intelligence in the power management system, it does not determine which end devices under its control to turn-off during a power reduction event, instead relying on the host device to make such decision. For example, during a power reduction event, the end device must request permission from the OPP to turn on. The request is forwarded to the host device for a decision on the request in view of the parameters of the on-going power reduction event. The system also contemplates periodic reading of utility meters by the OPP and storage of the read data in the OPP for later communication to the host device. The OPP may also include intelligence to indicate to the host processor that the OPP will not be able to comply with a power reduction command due to the inability of a load under the OPP's control to be deactivated. However, neither the host processor nor the OPP determine which loads to remove in order to satisfy a power reduction command from an electric utility, particularly when the command is issued by one of several utilities under the management of a power management system. Further, neither the host processor nor the OPP tracks or accumulates power saved and/or carbon credits earned on a per customer or per utility basis for future use by the utility and/or customer. Still further, the system of this publication lacks a reward incentive program to customers based on their participation in the power management system. Still further, the system described in this publication does not provide for secure communications between the host processor and the OPP, and/or between the OPP and the end device. As a result, the described system lacks many features that may be necessary for a commercially viable implementation.

SUMMARY OF THE INVENTION

According to one embodiment, the present invention provides a method for managing a flow of power supplied by an electric utility to a plurality of power consuming devices. The power consuming devices are located at one or more service points to which electrical power is supplied by the electric utility. According to the method, which may be executed by a system controller, a group of one or more client devices is determined to which to issue or communicate a power control message. Each client device of the group of client devices controls at least one controllable device and each controllable device controls (e.g., selectively enables and disables) a flow of electric power to at least one of the power consuming devices. The power control message indicates at least one of an amount of electric power to be reduced and an identification of one or more controllable devices to be instructed to disable a flow of electric power to one or more associated power consuming devices. The power control message is issued or communicated to the group of client devices to initiate a power reduction control event. Subsequent to initiation of the power reduction event, at least one controllable device is determined to have prematurely exited the power reduction event. Premature exiting from the power reduction event may have occurred as a result of a user adjusting a controllable device either manually (e.g., through manual manipulation of a user interface of the controllable device) or electronically (e.g., through networked control, such as using Zigbee, Bluetooth, Wi-Fi, broadband over powerline (BPL), cable, digital subscriber line (DSL), satellite, a wireless wide area network (e.g., a cellular network), or any other networking platform to control the controllable device directly (e.g., through a control application running on a computer or portable device)) so as to enable a flow of electric power to a power consuming device which previously had its flow of electric power disabled or reduced upon initiation of the power reduction event. For example, where a heating, ventilation, and air conditioning (HVAC) system is a power consuming device that was disabled upon initiation of the power reduction event, the controllable device for the HVAC system may be a digital thermostat and a user may have manually or electronically adjusted the thermostat temperature setting to decrease (when the HVAC system is in cooling mode) or increase (when the HVAC system is in heating mode) the temperature set point. Alternatively, where the disabled power consuming device is a binary, switched, or otherwise environmentally-independent device (such as, for example, a hot water heater, a dryer, a pool pump, or a lighting system), the controllable device may be a smart breaker that was electronically opened upon initiation of the power reduction event and a user may have manually or electronically closed the smart breaker to allow current to flow to the previously disabled power consuming device.

Premature exiting of the power reduction event may have alternatively occurred through operation of other customer override mechanisms. For example, a utility customer may have accessed an Internet-based interface to the system controller (e.g., such as through use of an Internet-based, customer dashboard), and entered an override request causing the power reduction event to terminate with respect to one or more selected controllable devices. The override request may have identified the controllable device or devices directly (e.g., by making an HVAC thermostat adjustment or requesting closure of a particular smart breaker) or indirectly (e.g., by generally requesting termination of the power reduction event at the customer's entire service point or with regard to one or more specific power consuming devices, such as the HVAC system, hot water heater, lighting, pool pump, one or more appliances, and so forth). Responsive to the override request, a new power control message may be issued (e.g., sent, transmitted, or otherwise communicated) to the client device controlling the controllable device(s) that has prematurely exited the power reduction event. The new power control message instructs the client device to enable a flow of electric power to the controllable device(s) that has prematurely exited the power reduction event.

In yet another embodiment in which the method is executed by a system controller, the system controller may receive a power control command from the electric utility. The power control command may require a reduction in an amount of electric power consumed by at least some of the power consuming devices located at service points serviced by the electric utility. In this case, the system controller may determine the group of client devices to which to issue or communicate the power control message initiating the power reduction event responsive to the power control command. The system controller may also determine an amount of power saved by the electric utility as a result of issuance of the power control message and store an indication of the amount of saved power (e.g., in a database). Having determined the amount of saved power, the system controller or some other device may further correlate the amount of saved power to an amount of gaseous emissions-based credits (e.g., carbon credits or offsets, or credits or offsets based on other gaseous emissions) and store an indication of the amount of gaseous emissions-based credits (e.g., in the database).

In a further embodiment in which the method is executed by a system controller, the system controller may determine a first amount of electric power that was saved due to participation in the power reduction control event by the controllable device(s) that has prematurely exited the power reduction event. Additionally, the system controller may select or otherwise determine a second group of one or more client devices to which to issue or communicate a second power control message that continues the previously initiated power reduction event. The selected second group of client devices controls one or more controllable devices that are operable to control (e.g., selectively enable and disable) a flow of a second amount of electric power to one or more power consuming devices, wherein the second amount of electric power is at least a portion of the first amount of electric power. In one embodiment, the second amount of electric power is substantially the same as (e.g., 90-100% of) the first amount of electric power. In another embodiment, the client devices in the selected second group are not disabling a flow of electric power to any power consuming devices at the time at which the second group of client devices is determined. For example, if the controllable device that prematurely exited the power reduction event had controlled one or more power consuming devices to save power at a rate of two megawatts per hour during its participation in the power reduction event, the system controller selects one or more client devices managing one or more controllable devices which can preferably save power at a rate of at least two megawatts per hour. If such client devices are not available, the system controller may select one or more client devices managing one or more controllable devices which can preferably save power at a lower rate (e.g., less than two megawatts per hour). Once the second group of client devices has been determined, the system controller may issue or communicate the second power control message to the second group of client devices to continue the power reduction event.

In a further embodiment, a method for managing a flow of power supplied by an electric utility to a plurality of power consuming devices may be executed by a client device located at a utility service point at which the power consuming devices are located. According to this embodiment, the client device receives a power control message from a system controller to initiate a power reduction control event. The power control message indicates at least one of an amount of electric power to be reduced and an identification of at least one controllable device to be instructed to disable a flow of electric power to one or more associated power consuming devices. Responsive to the power control message, the client device issues or communicates a power management command to one or more controllable devices, which control a flow of electric power to one or more associated power consuming devices (e.g., HVAC system, lighting, hot water heater, appliances, and so forth). Receipt of the power management command from the client device causes the controllable device(s) to disable a flow of electric power to at least one associated power consuming device in furtherance of the power reduction event. Subsequent to issuing the power management command, the client device determines that a controllable device has prematurely exited the power reduction event by enabling a flow of electric power to an associated power consuming device. The client device then sends a status message to the system controller informing the system controller that the controllable device has exited the power reduction event.

The client device may determine that a controllable device has prematurely exited the power reduction event by determining that the controllable device has been adjusted by a user either manually (e.g., through manual manipulation of a user interface of the controllable device) or electronically (e.g., through networked control, such as using Zigbee, Bluetooth, Wi-Fi, BPL, cable, DSL, satellite, a wireless wide area network, or any other networking platform to control the controllable device directly (e.g., through a control application running on a computer or portable device)) so as to enable a flow of electric power to a power consuming device under the control of the controllable device. For example, in one embodiment, the controllable device may be a thermostat of an HVAC system. In such a case, the client device may determine that the controllable device has prematurely exited the power reduction event by determining that a temperature setting of the thermostat has been adjusted by a user (e.g., decreased when the HVAC system is in cooling mode or increased when the HVAC system is in heating mode). In an alternative embodiment, the controllable device may be a smart breaker, such as where the power consuming device under control is a binary, switched, or otherwise environmentally-independent device (e.g., a hot water heater, a dryer, a lighting system, and/or a pool pump). In this case, the client device may determine that the controllable device has prematurely exited the power reduction event upon determining that the smart breaker, which was previously opened by the controllable device upon commencement of the power reduction event, has been closed by a user either manually or electronically.

In yet another embodiment, the client device may alternatively determine that a controllable device has prematurely exited the power reduction event by receiving another control message from the system controller. In this case, the newly received control message instructs the client device to enable a flow of electric power to the controllable device that has prematurely exited the power reduction event. For instance, a utility customer may have accessed an Internet-based interface to the system controller and entered an override request causing the power reduction event to terminate with respect to one or more selected controllable devices. The override request may have identified the controllable device or devices directly or indirectly. Responsive to the override request, the new power control message was sent from the system controller to the client device to effect the controllable device's premature exit from the power reduction control event.

By providing power load management in this manner, the present invention monitors and accounts for an unexpected customer override during a power reduction control event and provides options for continuing the control event notwithstanding the customer's change of heart with respect to some or all of the service point's controllable devices that are participating in the event. Thus, the present invention provides a control framework that enables an active load management system to detect and adapt to an unexpected and potentially detrimental change of circumstances arising during a power reduction control event.

BRIEF DESCRIPTION OF THE DRAWINGS

The accompanying figures, where like reference numerals refer to identical or functionally similar elements throughout the separate views and which together with the detailed description below are incorporated in and form part of the disclosure, serve to further illustrate various embodiments and to explain various principles and advantages all in accordance with the present invention.

Figure 1:
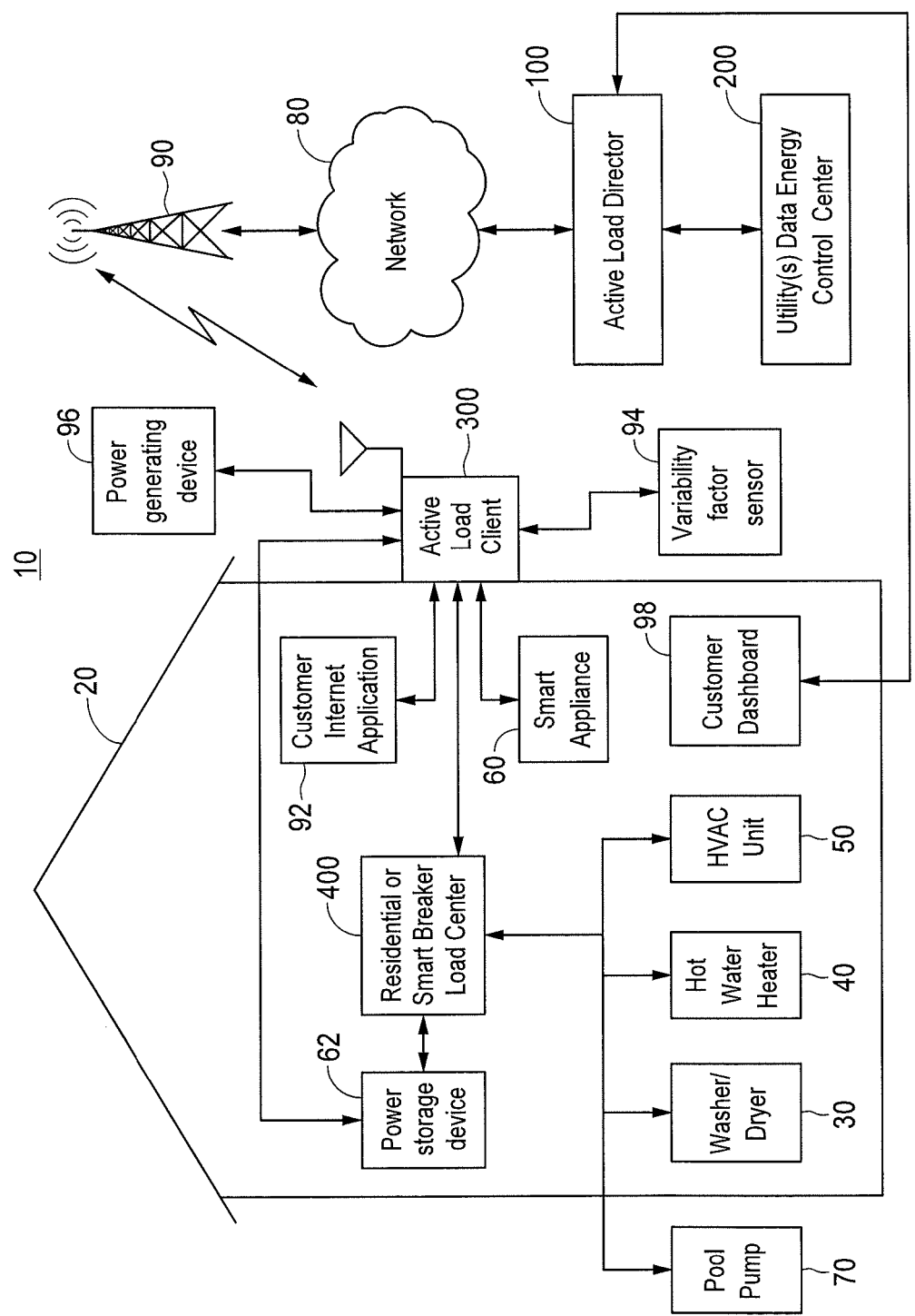
FIG. 1 is a block diagram of an exemplary IP-based, active load management system in accordance with one embodiment of the present invention.

Skilled artisans will appreciate that elements in the figures are illustrated for simplicity and clarity and have not necessarily been drawn to scale. For example, the dimensions of some of the elements in the figures may be exaggerated alone or relative to other elements to help improve the understanding of the various embodiments of the present invention.

DETAILED DESCRIPTION

Before describing in detail exemplary embodiments that are in accordance with the present invention, it should be observed that the embodiments reside primarily in combinations of apparatus components and processing steps related to actively managing power loading on an individual service point, group of service points, and/or entire utility basis. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

Additionally, the term "ZigBee" refers to any wireless communication protocol adopted by the Institute of Electrical and Electronics Engineers (IEEE) according to standard 802.15.4 or any successor standard(s), and the term "Bluetooth" refers to any short-range communication protocol implementing IEEE standard 802.15.1 or any successor standard(s). Power line communications refer to any communication of data using power lines, including, but not limited to, Broadband over PowerLine (BPL) in its various forms, including through specifications promulgated or being developed by the HOMEPLUG Powerline Alliance and the IEEE. The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Code Division Multiple Access (CDMA) Evolution Data-Optimized (EVDO) Revision A (CDMA EVDO Rev. A)" refers to the communication protocol adopted by the ITU under standard number TIA-856 Rev. A. The term "Long Term Evolution (LTE)" refers to any communication protocol based on Release 8 (or any subsequent release) from the Third Generation Partnership Project (3GPP) or another mobile telecommunications standards body referring to the evolution of GSM-based networks to voice, video and data standards anticipated to be replacement protocols for HSPA and EVDO.

The terms "utility," "electric utility," "power utility," and "electric power utility" refer to any entity that generates and distributes electrical power to its customers, that purchases power from a power-generating entity and distributes the purchased power to its customers, or that supplies electricity created actually or virtually by alternative energy sources, such as solar power, wind power or otherwise, to power generation or distribution entities through the Federal Energy Regulatory Commission (FERC) electrical grid or otherwise. The term "environment" refers to general conditions, such as air temperature, humidity, barometric pressure, wind speed, rainfall quantity, water temperature, and so forth, at or proximate a service point or associated with a device (e.g., water temperature of water in a hot water heater or a swimming pool). The term "device," as used herein, means a power-consuming device and/or any associated controllable component thereof or used therewith, such as a control module located within a power consuming device (e.g., a smart appliance) or a remote smart breaker. There may generally be two different types of devices within or located at a service point—namely, an environmentally-dependent device and an environmentally-independent device. An environmentally-dependent device is any device that turns on or off, or modifies its behavior, based on one or more sensors that detect characteristics or conditions, such as temperature, humidity, pressure, or various other characteristics or conditions, of an environment. An environmentally-dependent device may directly affect and/or be affected by the environment in which it operates. Examples of environmentally-dependent devices include, but are not limited to, addressable thermostats for HVAC systems and addressable control modules for smart refrigerators and/or freezers. An environmentally-independent device is any device that turns on or off, or modifies its behavior, without reliance upon inputs from any environmental sensors. Generally speaking, an environmentally-independent device does not directly affect, and is not typically affected by, the environment in which it operates; although, as one of ordinary skill in the art will readily recognize and appreciate, operation of an environmentally-independent device can indirectly or incidentally affect, or occasionally be affected by, the environment. For example, as those skilled in the art readily understand, dryers and other appliances generate heat during ordinary operation, thereby causing some heating of the ambient air proximate the device. Examples of environmentally-independent devices include, but are not limited to, addressable smart breakers, hot water heaters, washers, dryers, and lighting systems. The term "credits" refers to carbon credits and/or renewable energy credits, regardless of how computed. The terms "energy" and "power" are used interchangeably herein.

It will be appreciated that embodiments or components of the systems described herein may be comprised of one or more conventional processors and unique stored program instructions that control the one or more processors to implement, in conjunction with certain non-processor circuits, some, most, or all of the functions for managing power load distribution as described herein. The non-processor circuits may include, but are not limited to, radio receivers, radio transmitters, antennas, modems, signal drivers, clock circuits, power source circuits, relays, meters, smart breakers, current sensors, and user input devices. As such, these functions may be interpreted as steps of a method to distribute information, as well as various command and control signals, between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the foregoing approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

The present invention can be more readily understood with reference to FIGS. 1-10, in which like reference numerals designate like items. FIG. 1 depicts an exemplary IP-based active load management system (ALMS) 10 that may be utilized by an electric utility, which may be a conventional power-generating utility or a virtual utility, in accordance with the present invention. The below description of the ALMS 10 is limited to specific disclosure relating to embodiments of the present invention. Additional description of the ALMS 10 is provided in commonly-owned U.S. Pat. No. 7,715,951, which is incorporated herein by this reference as if fully set forth herein. The use of an ALMS 10 to implement a virtual utility is described in detail in co-pending and commonly-owned U.S. application Ser. No. 12/001,819, which was filed on Dec. 13, 2007, was published as U.S. Patent Application Publication No. US 20090063228 A1 on Mar. 5, 2009, and is incorporated herein by this reference as if fully set forth herein.

The exemplary ALMS 10 monitors and manages power distribution via a system controller, such as an active load director (ALD) 100, connected between one or more utility control centers (UCCs) 200 (one shown) and one or more client devices or local controllers, such as active load clients (ALCs) 300 (one shown), installed at one or more service points 20 (one shown). The ALD 100 may communicate with the utility control center 200 and each active load client 300 either directly or through a network 80 using the Internet Protocol (IP) or any other communication protocols. For example, the ALD 100 may communicate using RF systems operating via one or more base stations 90 (one shown) using one or more wireless communication protocols, such as GSM, Enhanced Data GSM Environment (EDGE), ANSI C12.22, HSPA, LTE, Time Division Multiple Access (TDMA), or CDMA data standards, including CDMA 2000, CDMA Revision A, CDMA Revision B, and CDMA EVDO Rev. A. Alternatively, or additionally, the ALD 100 may communicate wholly or partially via wired interfaces, such as through the use of digital subscriber line (DSL) technology, cable television IP-based technology, and/or other related technology. In the exemplary embodiment shown in FIG. 1, the ALD 100 communicates with one or more active load clients 300 using a combination of traditional IP-based communication (e.g., over a trunked line) to a base station 90 and a wireless channel implementing the HSPA or EVDO protocol from the base station 90 to the active load client 300. The distance between the base station 90 and the service point 20 or the active load client 300 is typically referred to as the "last mile" even though the distance may not actually be a mile The ALD 100 or equivalent system controller may be implemented in various ways, including, but not limited to, as an individual server, as a blade within a server, in a distributed computing environment, or in other combinations of hardware and software. In the following disclosure, the ALD 100 is described as embodied in an individual server to facilitate an understanding of the present invention.

Each active load client 300 is accessible through a specified address (e.g., IP address) and controls and monitors the state of individual smart breaker modules or intelligent appliances 60 installed at the service point 20 (e.g., in the business or residence) to which the active load client 300 is associated (e.g., connected or supporting). Each active load client 300 is preferably associated with a single residential or commercial customer. In one embodiment, the active load client 300 communicates with a residential load center 400 that contains smart breaker modules, which are able to switch from an "ON" (active) state to an "OFF" (inactive) state, and vice versa, responsive to signaling from the active load client 300. Smart breaker modules may include, for example, smart breaker panels manufactured by Schneider Electric SA under the trademark "Square D" or Eaton Corporation under the trademark "Cutler-Hammer" for installation during new construction. For retro-fitting existing buildings, smart breakers having means for individual identification and control may be used. Typically, each smart breaker controls a single appliance (e.g., a washer/dryer 30, a hot water heater 40, an HVAC unit 50, or a pool pump 70). In an alternative embodiment, IP addressable relays or device controllers that operate in a similar fashion as a "smart breaker" may be used in place of smart breakers, but would be installed coincident with the load under control and may measure the startup power, steady state power, power quality, duty cycle and/or energy load profile of the individual appliance 60, HVAC unit 40, pool pump 70, hot water heater 40 or any other controlled device as determined by the utility or end customer.

Additionally, the active load client 300 may control individual smart appliances 60 directly (e.g., without communicating with the residential load center 400) via one or more of a variety of known communication protocols (e.g., IP, BPL, Ethernet, Bluetooth, ZigBee, Wi-Fi (IEEE 802.11 protocols), WiMax (IEEE 802.16 protocols), HSPA, EVDO, etc.). Typically, a smart appliance 60 includes a power control module (not shown) having communication capabilities. The power control module is installed in-line with the power supply to the appliance 60, between the actual appliance and the power source (e.g., the power control module is plugged into a power outlet at the home or business and the power cord for the appliance 60 is plugged into the power control module). Thus, when the power control module receives a command to turn off the appliance 60, it disconnects the actual power supplying the appliance 60. Alternatively, a smart appliance 60 may include a power control module integrated directly into the appliance, which may receive commands and control the operation of the appliance 60 directly (e.g., a smart thermostat may perform such functions as raising or lowering the set temperature, switching an HVAC unit on or off, or switching a fan on or off). Smart appliances 60, smart breakers, device controllers, and/or other controllable devices may include user interfaces through which customers or other users can manually or electronically adjust the controllable devices (e.g., change temperature set points, turn the devices on and off, and so forth, as so desired). As described in more detail below with respect to FIGS. 9 and 10, the user interface of a controllable device may be used by a utility customer or other user to prematurely withdraw the controllable device from a power reduction control event.

The active load client 300 may further be coupled to one or more variability factor sensors 94. Such sensors 94 may be used to monitor a variety of variability factors affecting operation of the devices, such as inside and/or outside temperature, inside and/or outside humidity, time of day, pollen count, amount of rainfall, wind speed, and other factors or parameters.

For a service point 20 associated with a business or industrial setting, the ALMS 10 may be utilized to lower power consumption during times of peak demand by cutting power to switch-based or environmentally-independent devices (such as lights in common areas and/or elevators) and reducing or increasing, as applicable depending on the set point and/or mode (heating or cooling) of the device, the temperature or other environmental characteristic under the control of environmentally-dependent devices (such as reducing heating or air conditioning in common areas, reducing furnace temperatures or increasing refrigerator temperatures).

As also shown in FIG. 1, a service point 20 may optionally have one or more power generating devices 96 (one shown) on-site, such as solar panels, fuel cells, and/or wind turbines. When included, each power generating device 96 is coupled to the active load client 300. Power supplied by the power generating device 96 may be used in whole or in part by devices at the service point 20 and any extra, unused power may be added to the utility's overall capacity. In accordance with net metering regulations, the utility may provide credit to the service point owner for any energy produced at the service point 20 and supplied to the utility's power grid.

The service point 20 may optionally further include one or more power storage devices 62 (one shown) on-site to store energy supplied by the utility or produced by the power generating device 96. The power storage device 62 may be primarily used for power storage or, more typically, may have another primary purpose, such as power consumption, although storage of power is a secondary purpose. Normally, the power storage device 62 is plugged into the power grid and incrementally stores power which can be used or consumed later. One example of a power storage device 62 is an electric vehicle. When not in use, the power storage device 62 may be plugged into an outlet at the service point 20 to draw and store energy from the utility's grid. The power storage device 62 may then be unplugged later and used for its primary purpose. In the example of an electric vehicle, the power storage device 62 is unplugged to be used for transportation. Alternatively, the power storage device 62 may, at a later time after being charged, serve as a source of power, akin to a power generating device 96. For example, an electric vehicle may be plugged into a socket at the service point 20 and have some or all of its remaining stored power supplied to the utility's grid when, for example, the vehicle owner is not planning on using the vehicle for awhile. In such a case, the vehicle owner could elect to supply power to the utility grid at high peak load times and receive or consume power from the grid at low peak load times, effectively treating stored power as a commodity.

The service point 20 may further include a web-based user interface (e.g., Internet-accessible web portal) into a web browser interface of the ALD 100. The web-based interface is referred to herein as a "customer dashboard" 98. When the customer dashboard 98 is accessed by the customer via a computer, smart phone, personal digital assistant, or other comparable device, the customer dashboard 98 may be used by the customer to specify preferences for use by the ALMS 10 to control devices at the customer's service point 20. The customer dashboard 98 effectively provides the customer with access into the ALD 100. The ALD 100 (e.g., through a web browser interface) accepts inputs from the customer dashboard 98 and outputs information to the customer dashboard 98 for display to the customer. The customer dashboard 98 may be accessed from the service point 20 or remotely from any Internet-accessible device, preferably through use of a user name and password. Thus, the customer dashboard 98 is a preferably secure, web-based interface used by customers to specify preferences associated with devices controlled by the ALD 100 and located at the customer's service point 20, as well as to provide information requested by a customer personal settings application 138 or a customer sign-up application 116 executed by the ALD 100 in connection with controlled devices and/or service point conditions or parameters. Customer preferences may include, for example, control event preferences (e.g., times, durations, etc.), bill management preferences (e.g., goal or target for maximum monthly billing cost), maximum and minimum boundary settings for environmental characteristics or conditions, and other preferences. As shown in FIG. 1, the customer dashboard 98 may be connected to the ALD 100 via an Internet service provider for the service point 20 or may be implemented as a customer Internet application 92 when Internet service is supplied through the active load client 300 as discussed below and in U.S. Patent Application Publication No. US 20090063228. As also discussed in more detail below with respect to FIGS. 9 and 10, the customer dashboard 98 may be used by a utility customer to override a power reduction control event and withdraw a controllable device from the control event prematurely.

Figure 2:
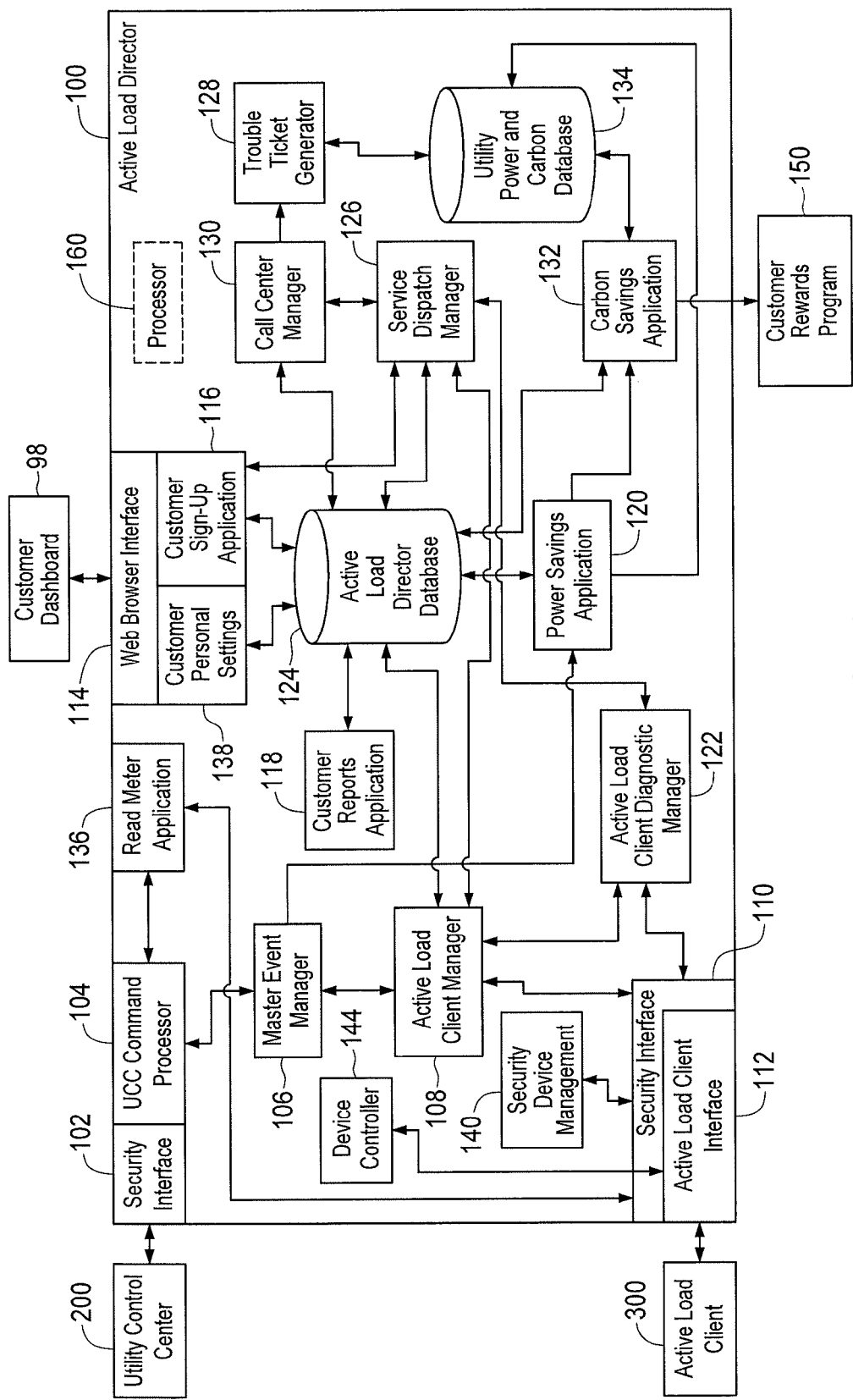
FIG. 2 is a block diagram illustrating an exemplary system controller (e.g., an active load director) as used in the active load management system of FIG. 1.

Referring now to FIG. 2, the ALD 100 or other system controller may serve as the primary interface to customers, as well as to service personnel, and operates as the system controller by sending control messages to, and collecting data from, installed active load clients 300. In the exemplary embodiment depicted in FIG. 2, the ALD 100 includes a utility control center (UCC) security interface 102, a UCC command processor 104, a master event manager 106, an ALC manager 108, an ALC security interface 110, an ALC interface 112, a web browser interface 114, a customer sign-up application 116, customer personal settings 138, a customer reports application 118, a power savings application 120, an ALC diagnostic manager 122, an ALD database 124, a service dispatch manager 126, a trouble ticket generator 128, a call center manager 130, a carbon savings application 132, a utility power and carbon (P&C) database 134, a read meter application 136, a security device manager 140, and a device controller 144. The operational details of several of the elements of the ALD 100 are described below. The operational details of the remaining elements of the ALD 100 may be found in U.S. Pat. No. 7,715,951 and U.S. Patent Application Publication No. US 20090062970.

In one embodiment, customers use the customer dashboard 98 to interact with the ALD 100 through the web browser interface 114 and subscribe to some or all of the services offered by the ALMS 10 via the customer sign-up application 116. In accordance with the customer sign-up application 116, the customer specifies customer personal settings 138 that contain information relating to the customer and the customer's service point 20 (e.g., residence or business), and defines the extent of service to which the customer wishes to subscribe. For example, as noted above, customer personal settings 138 may include, for example, control event preferences (e.g., times, durations, etc., such as to, for example, implement an energy conservation program or profile), bill management preferences (e.g., goal or target for maximum monthly billing cost), maximum and minimum boundary settings for environmental characteristics or conditions (e.g., maximum and minimum temperature settings for an HVAC system during heating and cooling), and other preferences. Additional details relating to the customer sign-up application 116 and the input of customer personal settings 138 are discussed below and in U.S. Patent Application Publication No. US 20100145534 A1, which is incorporated herein by this reference. Customers may also use the customer dashboard 98 to access and modify information pertaining to their existing accounts after they have been established. Customers may further use the customer dashboard 98 to override a power reduction control event as described below with respect to FIGS. 9 and 10.

The ALD 100 also includes a UCC security interface 102 which provides security and encryption between the ALD 100 and a utility company's control center 200 to ensure that no third party is able to provide unauthorized directions to the ALD 100. A UCC command processor 104 receives and sends messages between the ALD 100 and the utility control center 200. Similarly, an ALC security interface 110 provides security and encryption between the ALD 100 and each active load client 300 in the system 10, ensuring that no third parties can send directions to, or receive information from, the active load client 300. The security techniques employed by the ALC security interface 110 and the UCC security interface 102 may include conventional symmetric key or asymmetric key algorithms, such as Wireless Encryption Protocol (WEP), Wi-Fi Protected Access (WPA and WPA2), Advanced Encryption Standard (AES), Pretty Good Privacy (PGP), or proprietary encryption techniques.

In one embodiment, the commands that can be received by the UCC command processor 104 from the electric utility's control center 200 include a "Cut" command, a "How Much" command, an "End Event" command, and a "Read Meters" command. The "Cut" command instructs the ALD 100 to reduce a specified amount of power for a specified amount of time. The specified amount of power may be an instantaneous amount of power or an average amount of power consumed per unit of time. The "Cut" command may also optionally indicate general geographic areas or specific locations for power load reduction. The "How Much" command requests information for the amount of power (e.g., in megawatts or megawatt-hours) that can be reduced by the requesting utility control center 200. The "End Event" command stops the present ALD transaction (e.g., control event). The "Read Meters" command instructs the ALD 100 to read the meters for all customers serviced by the requesting utility or for one or more specific customers serviced by the requesting utility.

The UCC command processor 104 may send a response to a "How Much" command or an "Event Ended" status confirmation to a utility control center 200. A response to a "How Much" command returns an amount of power that can be cut. An "Event Ended" acknowledgement message confirms that the present ALD transaction has ended.

The master event manager 106 maintains the overall status of the power load activities controlled by the ALMS 10. In one embodiment, the master event manager 106 maintains a separate state for each utility that is controlled (when multiple utilities are controlled) and tracks the current power usage within each utility. The master event manager 106 may also track the management condition of each utility (e.g., whether or not each utility is currently being managed). The master event manager 106 receives instructions in the form of transaction requests from the UCC command processor 104 and routes instructions to components necessary to complete the requested transaction, such as the ALC manager 108 and the power savings application 120.

The ALC manager 108 routes instructions between the ALD 100 and each active load client 300 within the system 10 through the ALC interface 112. For instance, the ALC manager 108 may track the state of every active load client 300 serviced by specified utilities by communicating with the active load client 300 through an individual IP address. The ALC interface 112 translates instructions (e.g., transactions) received from the ALC manager 108 into the proper message structure understood by the targeted active load client 300 and then sends the message to the active load client 300. Likewise, when the ALC interface 112 receives messages from an active load client 300, it translates the message into a form understood by the ALC manager 108 and routes the translated message to the ALC manager 108.

The ALC manager 108 receives from each active load client 300 that it services, either periodically or responsive to polling messages sent by the ALC manager 108, messages containing the present power consumption (or information from which the present power consumption can be determined, such as current draw and operating voltage(s)) and the status (e.g., "ON" or "OFF") of each device controlled by the active load client 300. Alternatively, if individual device metering is not available, then the total power consumption (or information from which the total power consumption can be determined, such as current draw and operating voltage(s)) and load management status for the entire active load client 300 may be reported. The information contained in each status message is stored in the ALD database 124 in a record associated with the specified active load client 300. The ALD database 124 preferably contains all the information necessary to manage every customer account and power distribution. In one embodiment, the ALD database 124 contains customer contact information, such as names, addresses, phone numbers, email addresses, and associated utility companies for all customers having active load clients 300 installed at their residences or businesses, as well as a description of specific operating instructions (e.g., customer preferences, such as set points and maximum permitted variances therefrom) for each managed device (e.g., IP-addressable smart breaker, appliance, or other controllable device), device status, and device diagnostic history.

There are several types of messages that the ALC manager 108 may receive from an active load client 300 and process accordingly. One such message is a security alert message. A security alert message originates from an optional security or safety monitoring system installed at the service point 20 (e.g., in the residence or business) and coupled to the active load client 300 (e.g., wirelessly or via a wired connection). When a security alert message is received, the ALC manager 108 accesses the ALD database 124 to obtain routing information for determining where to send the alert, and then sends the alert as directed. For example, the ALC manager 108 may be programmed to send the alert or another message (e.g., an electronic mail message or a pre-recorded voice message) to a security monitoring service company and/or the owner of the residence or business.

Another message that may be communicated between an active load client 300 and the ALC manager 108 is a report trigger message. A report trigger message alerts the ALD 100 that a predetermined amount of power has been consumed by a specific device monitored by the active load client 300. When a report trigger message is received from an active load client 300, the ALC manager 108 logs the information contained in the message in the ALD database 124 for the customer associated with the information-supplying active load client 300. The power consumption information is then used by the ALC manager 108 to determine the active load client(s) 300 to which to send a power reduction or "Cut" message during a power reduction control event.

Yet another message that may be exchanged between an active load client 300 and the ALC manager 108 is a status response message. A status response message reports the type and status of each device controlled by the active load client 300 to the ALD 100. When a status response message is received from an active load client 300, the ALC manager 108 logs the information contained in the message in the ALD database 124.

In one embodiment, upon receiving instruction (e.g., a "Cut" instruction) from the master event manager 106 to reduce power consumption for a specified utility, the ALC manager 108 determines which active load clients 300 and/or individually controlled devices to switch to the "OFF" state based upon present or prior power consumption data stored in the ALD database 124. Power consumption data may include power consumed, current drawn, duty cycle, operating voltage, operating impedance, time period of use, set points, ambient and outside temperatures during use (as applicable), and/or various other energy use or environmental data. The ALC manager 108 then sends a message to each selected active load client 300 containing instructions to turn off all or some of the devices under the active load client's control.

In another embodiment, a power savings application 120 may be optionally included to calculate the total amount of power saved by each utility during a power reduction event (also referred to herein as a "Cut event" or a control event), as well as the amount of power saved for each customer whose active load client 300 reduced an amount of power delivered to the customer's service point 20. The power savings application 120 accesses the data stored in the ALD database 124 for each customer serviced by a particular utility and stores the total cumulative power savings (e.g., in megawatts per hour or megawatt-hours) accumulated by each utility for each Cut event in which the utility participated as an entry in the utility Power and Carbon ("P&C") database 134.

In a further embodiment, an optional carbon savings application 132 uses the information produced by the power savings application 120 to determine the amount of carbon dioxide or carbon dioxide equivalents saved by each utility and by each customer for every Cut event. Carbon savings information, such as type of fuel used to generate power for the customer set that was included in the just completed control event, power saved as a result of the control event, governmental standard or other calculation rates, and/or other data (e.g., generation mix per serving utility and geography of the customer's location and the location of the nearest power source), is stored in the ALD database 124 for each active load client 300 (customer) and in the utility P&C database 134 for each utility. The carbon savings application 132 calculates the total equivalent carbon credits saved for each active load client 300 (customer) and utility participating in the previous Cut event, and stores the information in the ALD database 124 and the utility P&C database 134, respectively. The determination of credits by the carbon savings application 132 is described in more detail in U.S. Patent Application Publication No. US 20100235008 A1, which is incorporated herein by this reference. The carbon savings application 132 is preferably implemented as a set of computer instructions (software) stored in a memory (not shown) of the ALD 100 and executed by one or more processors 160 (one shown) of the ALD 100.

A read meter application 136 may be optionally invoked when the UCC command processor 104 receives a "Read Meters" or equivalent command from the utility control center 200. The read meter application 136 cycles through the ALD database 124 and sends a read meter message or command to each active load client 300, or those active load clients 300 specifically identified in the UCC's command, via the ALC manager 108. The information received by the ALC manager 108 from the active load client 300 is logged in the ALD database 124 for each customer. When all the active load client meter information has been received, the information is sent to the requesting utility control center 200 using a business to business (e.g., ebXML) or other desired protocol.

In a further embodiment, the ALD server 100 also includes a customer reports application 118 that generates reports to be sent to individual customers detailing the amount of power saved during a previous billing cycle. Each report may contain a cumulative total of power savings over the prior billing cycle, details of the amount of power saved per controlled device (e.g., breaker or appliance), power savings from utility-directed control events, power savings from customer-directed control events (e.g., as a result of customer personal settings 138 or in response to customer requests received via the customer dashboard 98), devices being managed, total carbon equivalents used and saved during the billing period, and/or specific details for each Cut event in which the customer's active load client 300 participated. Customers may also receive incentives and awards for participation in the ALMS 10 through a customer rewards program 150. For example, the utilities or a third party system operator may enter into agreements with product and/or service providers to offer system participants discounts on products and services offered by the providers based upon certain participation levels or milestones. The rewards program 150 may be setup in a manner similar to conventional frequent flyer programs in which points are accumulated for power saved (e.g., one point for each megawatt saved or deferred) and, upon accumulation of predetermined levels of points, the customer can select a product or service discount. Alternatively, a serving utility may offer a customer a rate discount for participating in the ALMS 10.

In one embodiment of the present invention, the utility or the ALD 100 determines the amount of carbon credits or offsets relating to carbon dioxide, sulfur dioxide, nitrous oxide, mercury, or other greenhouse gas emissions, which are associated with the electric power saved as the result of one or more control events. The carbon credits for greenhouse gases other than carbon dioxide are computed by converting the quantities of saved emissions by appropriate published conversion factors to obtain carbon dioxide ($CO_2$) equivalents, or $CO_2$e. The terms "carbon credits" and "carbon offsets" as used herein shall include credits or offsets associated with emissions of carbon dioxide and other greenhouse gases as converted into carbon dioxide equivalents.

The utility may offer to sell at least some of the carbon credits or offsets on an open market, under agreements with other electric utilities, or otherwise. For example, a virtual electric utility as described in U.S. Patent Application Publication No. US 20090063228 may trade or otherwise monetize the accumulated carbon credits or offsets through various commercial means, such as through one of the newly created credit or offset trading exchanges that have recently emerged on the European and American commodities exchanges. Alternatively, the virtual utility may agree to sell or offer to sell its carbon credits to other electric utilities, including, for example, a power generating utility with which the virtual utility has entered in to an electric power supply agreement as described in more detail in U.S. Patent Application Publication No. US 20090063228.

The amount of carbon credits or offsets accumulated by deferring or reducing power consumption is a function of the amount of power deferred or saved in combination with the generation mix of the serving utility that provides electricity to customers within a pre-defined geographic area affected by a control event. The generation mix identifies the energy (e.g., fuel) sources providing the overall capability of each serving utility to supply electricity at any given time. For instance, a serving utility may, at the time of a particular control event, obtain 31% of its overall capacity from burning coal, 6% from oil, 17% from nuclear facilities, 1% from hydroelectric plants, and the remaining 45% from clean technologies, such as natural gas or renewable energy sources (e.g., solar power or wind power). The generation mix is generally known in real time by the serving utility. However, due to the inherent delay associated with using the utility's transmission grid to convey power to and from various FERC-grid interconnected locations, historical data regarding the generation mix may be used to compute carbon credits on a delayed or non-real time basis after the actual events of conservation (e.g., one or more control events), trading or generation of the electricity. Alternatively, carbon credits or offsets may be determined by the virtual utility in real time based on real time generation mix data from the serving utility.

Because carbon credits relate only to the amount of carbon burned, each energy type has a different carbon credit rating. Consequently, the carbon value is determined by the make-up of the energy sources for the serving utility. Actual carbon credits accumulated by power load deferment may be calculated, for example, through execution of the carbon savings application 132 by a processor 160 of the ALD 100 or through other commercially viable load management or curtailment methods, such as large commercial industrial direct load control programs, which determine the actual load consumption deferred by each customer. Carbon credits or offsets, or credits or offsets for other greenhouse gas emissions, may be calculated based on the Kyoto Protocol, according to federal or state mandated methods, or according to a method agreed upon by an association or group of electric utilities.

Figure 3:
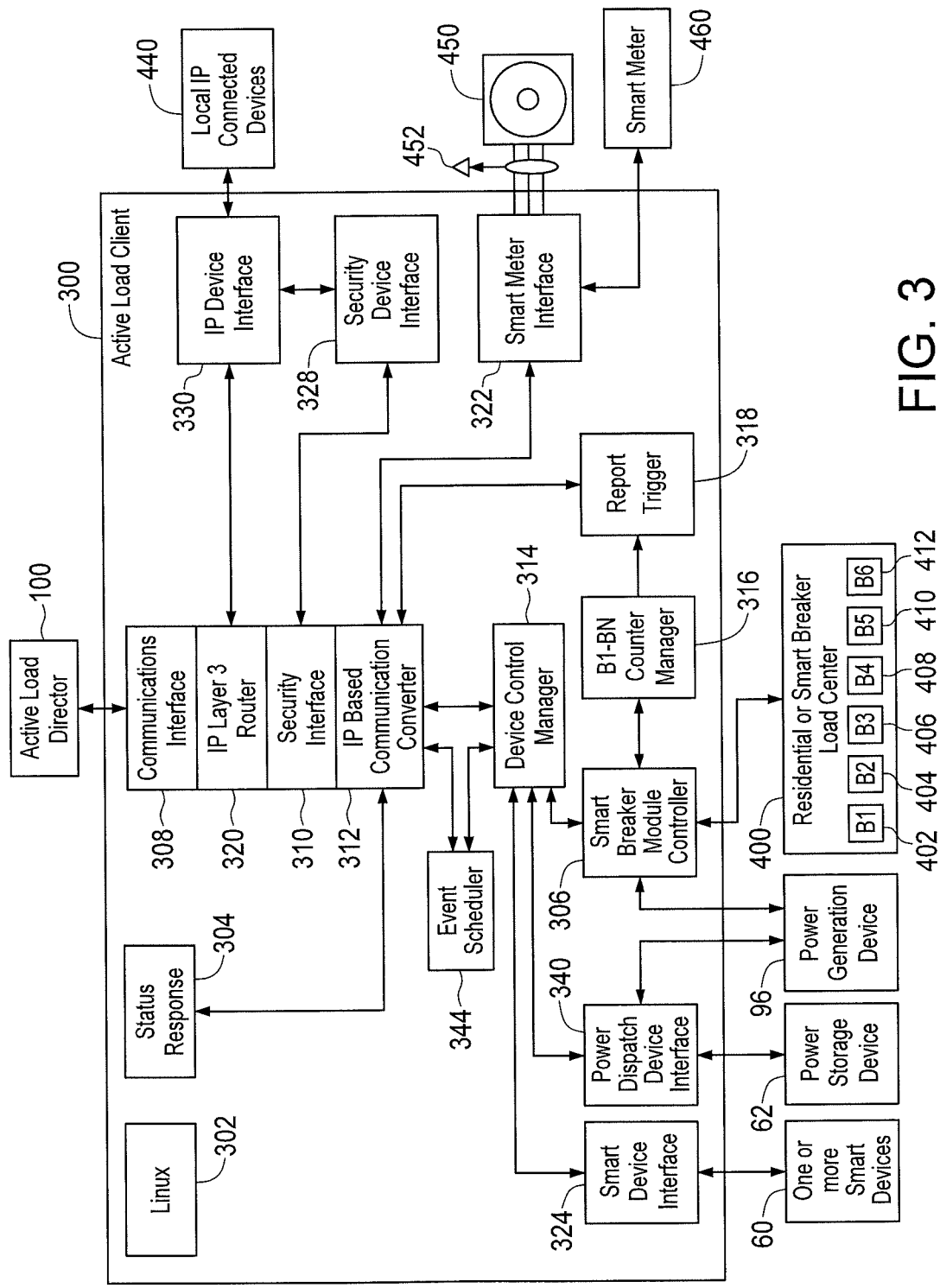
FIG. 3 is a block diagram illustrating an exemplary client device (e.g., an active load client) and residential or smart breaker load center as used in the active load management system of FIG. 1.

FIG. 3 illustrates a block diagram of an exemplary active load client 300 and residential load center 400 as used in accordance with one embodiment of the ALMS 10 of FIG. 1. The depicted active load client 300 includes an operating system 302 (e.g., Linux-based), a status response generator 304, a smart breaker module controller 306, a communications interface 308, a security interface 310, an IP-based communication converter 312, a device control manager 314, a smart breaker (B1-BN) counter manager 316, a layer-3 router 320, a smart meter interface 322, a smart device interface 324, an IP device interface 330, an event scheduler 344, and a power dispatch device interface 340. The active load client 300, in this embodiment, is a computer or processor-based system located on-site at a service point 20 (e.g., customer's residence or business). The primary function of the active load client 300 is to manage the power load levels of devices located at the service point 20, which the active load client 300 oversees and controls on behalf of the customer. In an exemplary embodiment, the active load client 300 may include dynamic host configuration protocol (DHCP) client functionality to enable the active load client 300 to dynamically request IP addresses for itself and/or one or more controllable devices 402-412, 60 managed thereby from a DHCP server on the host IP network facilitating communications between the active load client 300 and the ALD 100. The active load client 300 may further include router functionality and maintain a routing table of assigned IP addresses in a memory of the active load client 300 to facilitate delivery of messages from the active load client 300 to the controllable devices 402-412, 60. The active load client 300 may further include power dispatch functionality (e.g., a power dispatch device interface 340) and provide information to the ALD 100 regarding power available for dispatch from a power generation device 96 and/or a power storage device 62 at the service point 20.

A communications interface 308 facilitates connectivity between the active load client 300 and the ALD 100. Communication between the active load client 300 and the ALD 100 may be based on any type of IP or other wide area communication protocol, including but not limited to, the WiMax, HSPA, or LTE protocol. Thus, the communications interface 308 may be a wired or wireless modem, a wireless access point, or other appropriate interface.

A standard Layer-3 router 320 routes messages received by the communications interface 308 to both the active load client 300 and to any other locally connected IP device 440. The router 320 determines if a received message is directed to the active load client 300 and, if so, passes the message to a security interface 310 to be decrypted. The security interface 310 provides protection for the contents of the messages exchanged between the ALD 100 and the active load client 300. The message content is encrypted and decrypted by the security interface 310 using, for example, a symmetric encryption key composed of a combination of the IP address and GPS data for the active load client 300 or any other combination of known information. If the message is not directed to the active load client 300, then it is passed to the IP device interface 330 for delivery to one or more locally connected devices 440. For example, the router 320 may be programmed to route power load management system messages as well as conventional Internet messages. In such a case, the active load client 300 may function as a gateway for Internet service supplied to the residence or business instead of using separate Internet gateways or routers. When functioning to route both ALMS messages and conventional Internet messages (e.g., as a gateway for general Internet service), the IP router 320 may be programmed with a prioritization protocol that provides priority to the routing of all ALMS messages or at least some ALMS messages (e.g., those associated with control events).

An IP based communication converter 312 opens incoming messages from the ALD 100 and directs them to the appropriate function within the active load client 300. The converter 312 also receives messages from various active load client 300 functions (e.g., device control manager 314, status response generator 304, and report trigger application 318), packages the messages in the form expected by the ALD 100, and then passes them on to the security interface 310 for encryption.

The device control manager 314 processes power management commands for controllable components of various devices logically connected to the active load client 300. The controllable components can be smart breakers 402-412 (six shown) or controllers of smart devices 60, such as control modules of smart appliances. Each smart breaker component 402-412 is associated with at least one device and may be implemented as a load controller. A load controller may be configured to: (i) interrupt or reduce power to one or more associated devices during a control event, (ii) sense power demand during a control event, (iii) detect power generation from an associated device (when the associated device is a power generation device 96), (iv) sense conditions or characteristics (e.g., temperature, humidity, light, etc.) of an environment in which the associated device is operating, (v) detect device degradation or end of life, (vi) communicate with other device controllers at the service point 20 and/or within the ALMS 10, and/or (vii) validate operating performance of its associated device or devices. The load controller as implemented with a smart breaker 402-412 can manage multiple devices.

The device control manager 314 also processes "Query Request" or equivalent commands or messages from the ALD 100 by querying a status response generator 304, which maintains the type and status of each device controlled by the active load client 300, and providing the statuses to the ALD 100. The "Query Request" message may include information other than mere status requests. For example, the "Query Request" message may include information relating to customer personal settings 138, such as temperature or other environmental characteristic set points for environmentally-dependent devices, time intervals during which load control is permitted or prohibited, dates during which load control is permitted or prohibited, and priorities of device control (e.g., during a power reduction control event, hot water heater and pool pump are turned off before HVAC unit is turned off). If temperature set points or other non-status information are included in a "Query Request" message and there is a smart device 60 (e.g., an addressable thermostat) attached to the active load client 300 that can process the information, the temperature set points or other information are sent to that device 60 via the smart device interface 324.

The status response generator 304 receives status messages from the ALD 100 and, responsive thereto, polls each device under the active load client's control to determine whether the device is active and in good operational order. Each device (e.g., through its associated controller) responds to the polls with operational information (e.g., activity status and/or error reports) in a status response message. The active load client 300 stores the status responses in a memory associated with the status response generator 304 for reference in connection with control events.

The smart device interface 324 facilitates IP or other address-based communications to individual devices 60 (e.g., smart appliance power control modules) that are attached to the active load client 300. The connectivity can be through one of several different types of networks, including but not limited to, BPL, ZigBee, Wi-Fi, Bluetooth, or direct Ethernet communications. Thus, the smart device interface 324 is a modem adapted for use in or on the network connecting smart devices 60 to the active load client 300. The smart device interface 324 also allows the device control manager 314 to manage those devices, such as, for example, addressable thermostats, that have the capability to sense temperature settings and respond to variations in temperature or other environmental characteristics or conditions. The smart device interface 324 may be further configured to detect manual and electronic adjustments to the smart devices 60, which may be made by a customer during a control event to, for example, prematurely withdraw a smart device 60 from the event. Such a configured smart device interface 324 provides one mechanism for the active load client 300 to determine that a smart device 60 has prematurely exited the control event, as described in more detail below with respect to FIGS. 9 and 10.

The smart breaker module controller 306 formats, sends, and receives messages to and from the smart breaker module or load center 400. In one embodiment, the communication is preferably through a BPL connection. In such embodiment, the smart breaker module controller 306 includes a BPL modem and operations software. The smart breaker module 400 contains individual smart breakers 402-412, wherein each smart breaker 402-412 includes an applicable modem (e.g., a BPL modem when BPL is the networking technology employed) and is preferably in-line with power supplied to a single appliance or other device. Each smart breaker 402-412 may be manually adjustable or electronically adjustable, such as via signaling through a local IP connected device 440, to allow a customer to withdraw the breaker 402-412 from an ongoing control event as described in more detail below with respect to FIGS. 9 and 10. Thus, the smart breaker module controller 306 may be configured to detect manual and electronic opening and closing of smart breakers 402-412 during control events so as to detect that a smart breaker 402-412 has prematurely exited the event. The B1-BN counter manager 316 determines and stores real time power usage for each installed smart breaker 402-412. For example, the counter manager 316 tracks or counts the amount of power used through each smart breaker 402-412 and stores the counted amounts of power in a memory of the active load client 300 associated with the counter manager 316. When the counter for any breaker 402-412 reaches a predetermined limit, the counter manager 316 provides an identification number corresponding to the smart breaker 402-412 and the corresponding amount of power (power number) to the report trigger application 318. Once the information is passed to the report trigger application 318, the counter manager 316 resets the counter for the applicable breaker 402-412 to zero so that information can once again be collected. The report trigger application 318 then creates a reporting message containing identification information for the active load client 300, identification information for the particular smart breaker 402-

412 or device associated therewith, and the power number, and sends the report to the IP based communication converter 312 for transmission to the ALD 100. The ALD 100 stores the power consumption data in the ALD database 124 or some other repository as described in detail in U.S. Patent Application Publication No. US 20100222935 A1, which is incorporated herein by this reference.

The smart meter interface 322 manages either smart meters 460 that communicate using BPL or a current sensor 452 connected to a traditional power meter 450. When the active load client 300 receives a "Read Meters" command or message from the ALD 100 and a smart meter 460 is attached to the active load client 300, a "Read Meters" command is sent to the meter 460 via the smart meter interface 322 (e.g., a BPL modem). The smart meter interface 322 receives a reply to the "Read Meters" message from the smart meter 460, formats this information along with identification information for the active load client 300, and provides the formatted message to the IP based communication converter 312 for transmission to the ALD 100.

In another embodiment, some activities at the service point 20 may result in cost savings, as well as lower the overall carbon footprint at the service point 20. For instance, power added to the utility's grid from a power generation device 96 at the service point 20 may earn carbon credits if the power generation device 96 emits non-carbon greenhouse gases (which can be converted to carbon dioxide equivalents as discussed above). When the level of carbon dioxide equivalents emitted by the power generation device 96 is less than the level of carbon dioxide and/or carbon dioxide equivalents emitted by the utility to supply an equivalent amount of power, the service point's carbon footprint experiences a net reduction due to use of the power generation device 96. As a result, carbon credits are earned because power generation from the utility was prevented by using a local power generating device 96.

Energy consumption data is accurately measured by each active load client 300 and preferably sent to the ALD 100 periodically (e.g., every five minutes or at other intervals), but may be alternatively reported or requested (e.g., from the ALD 100 to the active load client 300) as often as necessary to achieve or maintain promulgated validation requirements, such as those provided under the Kyoto Protocol as proposed for implementation by the Bali Roadmap. The reporting frequency for automatic reporting may be a function of processor speed, memory capabilities, and transmission speed of transmissions between the active load client 300 and the ALD 100. As one of ordinary skill in the art will readily recognize and appreciate, power consumption and other data collected by an active load client 300 may be reported to the ALD 100 in batches, thereby allowing the active load client 300 to send very detailed measurement data to the ALD 100 without increasing the frequency of data transmissions. The measurement data supplied by each active load client 300 may be verified by the utility or a third party through querying of the ALD database 124 and/or querying of data optionally stored at the active load client 300. For example, the ALD database 124 can be queried by the power savings application 120 to retrieve the actual historical energy consumption data for the service point 20 or controlled devices thereat. The optional inclusion of specific location information based on geodetic references, such as GPS, topographical coordinates, physical address, and/or meter base number, further provides sufficient geodetic reference data to substantiate the credible and actual location of the power savings achieved, and resulting carbon credits earned, by the service point 20.

According to another embodiment, a customer may override an initiated control event by, for example, submitting an override request through the customer dashboard 98 or by manually or electronically adjusting a device (e.g., an HVAC thermostat) that is participating in the control event. In the event of a customer override, a device that would otherwise be turned off during the control event is not actually saving power. Because the ALD 100 has knowledge of the override, the ALD 100 can take the override into account when determining power savings and carbon credits. Additionally, duty cycle indicates the amount of time a device is normally on and off during a particular period of time. Therefore, if a control event occurs during a time period when the device's duty cycle is less than 100% or 1.0, then the quantity of carbon credits earned with respect to the device may be adjusted to account for the device's duty cycle during the control event. Still further, a duty cycle may be determined for a service point 20 as the percentage of time that all the controlled devices at the service point 20 are consuming power during a particular period of time. In such a case, the service point 20 may have multiple duty cycles (e.g., a different one for each quarter or other part of an hour). The power savings and carbon credit determinations can take into account the duty cycle of the service point 20 during the time period of a control event.

In another embodiment, the ALD database 124 may be updated by an active load client 300 to inform the ALD 100 when a device that is normally always in the "on" state (e.g., an environmentally-independent device) is explicitly turned off through instructions given by the customer separate from the settings maintained in the customer personal settings 138 (e.g., by using the customer dashboard 98 to instruct the device to shut off or by manually shutting the device off, such as by unplugging the device or switching off a circuit breaker for the device). The energy saved by turning the device off is reported to the ALD 100, stored in the utility power and carbon database 134, and used by the carbon savings application 132 to determine the carbon credits associated with the turn-off event based on Equation 3 above. The carbon savings application 132 may alternatively or additionally use the ALD database 124 to determine when a customer has manually adjusted a thermostat temperature set point or other device control set point from a previously-established "normal" set point. The energy saved as a result of the set point adjustment may be reported to the utility power and carbon database 134 and used by carbon savings application 132 to determine the carbon credits associated with the adjustment event. Therefore, in addition to carbon credits earned as a result of ALD-initiated control events, carbon credits may be earned by power conservation actions taken unilaterally by the service point customer.

As generally discussed above with respect to the optional inclusion of a power generating device 96 at the service point 20, the ALMS 10 of the present invention supports net metering. For example, referring back to FIG. 1, a power generating device 96, such as solar panels, wind turbines, or fuel cells, may, under certain circumstances and/or during certain periods of time, create electricity and add the created electricity to the power grid. In one embodiment, the power generating device 96 communicates information regarding the quantity of power generated to the active load client 300 through the power dispatch device interface 340, as shown in FIG. 3. The power dispatch device interface 340 forwards the data regarding the amount of power generated and the time or time period during which power generation occurred to the device control manager 314, which relays the data to the ALD 100 via the IP-based communication converter 312, the security interface 310, the IP router 320, and the communications interface 308.

As also generally discussed above, the ALMS 10 of the present invention supports the inclusion or use of power storage devices, such as batteries or electric vehicles, at a service point 20. Referring again to FIG. 1, a power storage device 62 may be used to store and/or dispatch energy. When the power storage device 62 is located at a service point 20 and receives energy from the grid and/or from a local power generating device 96 or dispatches energy to the grid and/or a local power generating device 96, the active load client 300 notifies the ALD 100. The ALD 100 logs the amount of energy supplied to or dispatched by the power storage device 62 and the time period of the storage or dispatch activity in the ALD database 124. The ALD 100 also determines the carbon footprint and the carbon credits associated with the storage and/or dispatch activity. For example, to determine the carbon footprint and carbon credits associated with the power storage or dispatch activity, the ALD 100 determines a generation mix relating to the amount of power supplied to or dispatched by the power storage device 62.

Figure 4:
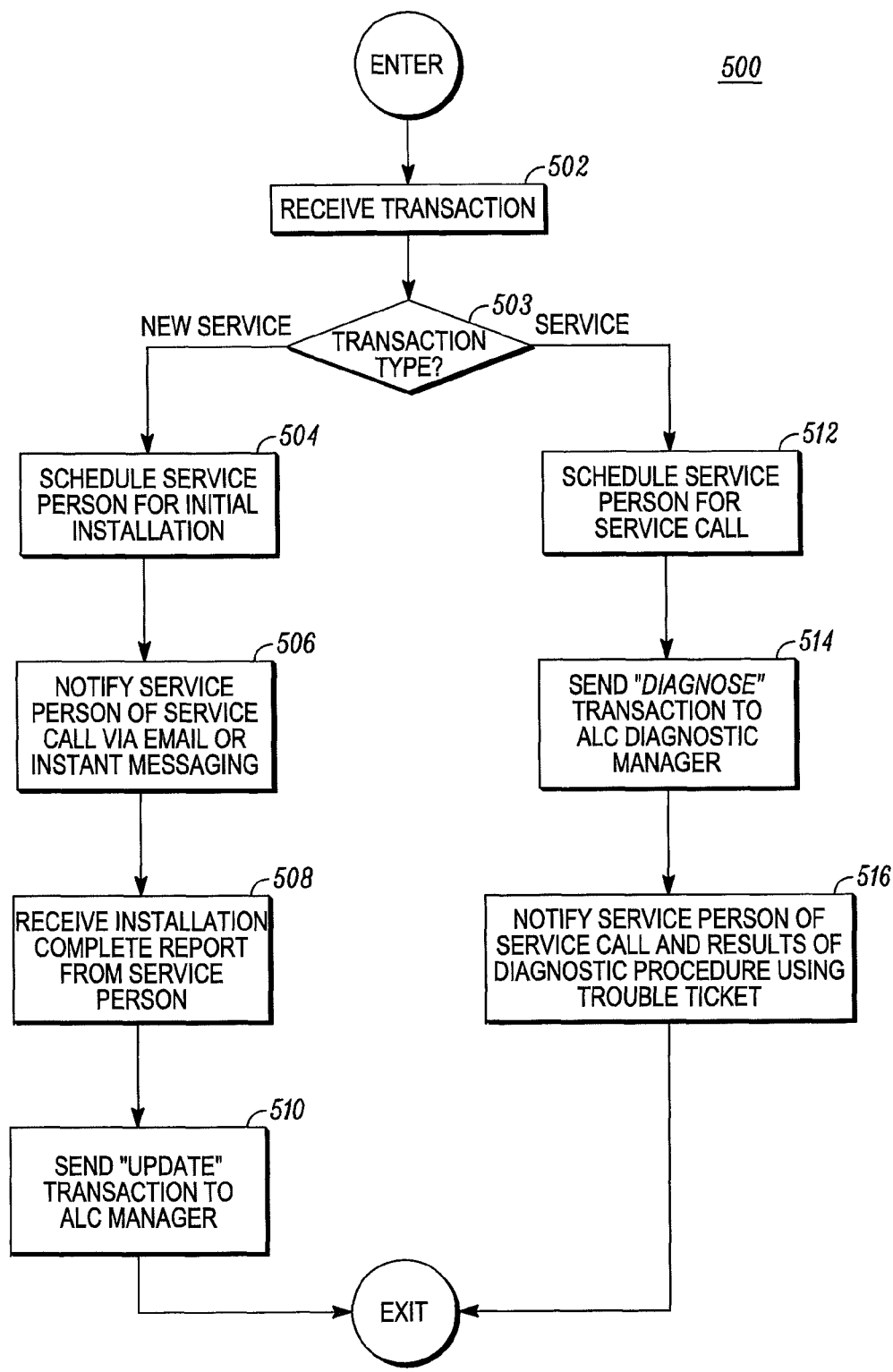
FIG. 4 is an operational flow diagram illustrating a method for automatically scheduling service calls in an active power load management system in accordance with one exemplary embodiment of the present invention.

FIG. 4 illustrates an exemplary operational flow diagram 500 providing steps executed by a system controller, such as the ALD 100 (e.g., as part of the service dispatch manager 126), to manage service requests in the exemplary ALMS 10, in accordance with one embodiment of the present invention. The steps of FIG. 4 are preferably implemented as a set of computer instructions (software) stored in a memory (not shown) of the ALD 100 and executed by one or more processors 160 (one shown) of the ALD 100. Pursuant to the logic flow, the service dispatch manager 126 receives (502) a transaction message or command and determines (503) the type of transaction. Upon receiving a "New Service" transaction message, the service dispatch manager 126 schedules (504) a service person (e.g., technician) to make an initial installation visit to the new customer. The service dispatch manager 126 then notifies (506) the scheduled service person, or dispatcher of service personnel, of an awaiting service call using, for example, email, text messaging, and/or instant messaging notifications.

In one embodiment, responsive to the service call notification, the service person obtains the new customer's name and address, a description of the desired service, and a service time from a service dispatch manager service log. The service person obtains a client device or local controller, such as an active load client 300, all necessary smart breaker modules 402-412, and all necessary smart switches to install at the customer location. The service person notes any missing information from the customer's database information (e.g., the devices being controlled, type make and model of each device, and any other information the system will need to function correctly). The service person installs the active load client 300 and smart breakers 402-412 at the new customer's location. A global positioning satellite (GPS) device may be optionally used by the service person to determine an accurate geographic location of the new customer service point, which will be added to the customer's entry in the ALD database 124 and may be used to create a symmetric encryption key to facilitate secure communications between the ALD 100 and the active load client 300. The physical location of the installed active load client 300 is also entered into the customer's entry. Smart switch devices may be installed by the service person or left at the customer location for installation by the customer. After the active load client 300 has been installed, the service dispatch manager 126 receives (508) a report from the service person, via a service log, indicating that the installation is complete. The service dispatch manager 126 then sends (510) an "Update" or equivalent transaction message to the ALC manager 108.

Returning to block 503, when a "Service" or similar transaction message or command is received, the service dispatch manager 126 schedules (512) a service person to make a service call to the specified customer. The service dispatch manager 126 then sends (514) a "Diagnose" or similar transaction to the ALC diagnostic manager 122. The ALC diagnostic manager 122 returns the results of the diagnostic procedure to the service dispatch manager 126, which then notifies (516) the service person of the service call and provides him or her with the results of the diagnostic procedure using a conventional trouble ticket. The service person uses the diagnostic procedure results in the trouble ticket to select the type of equipment and replacement parts necessary for the service call.

Figure 5:
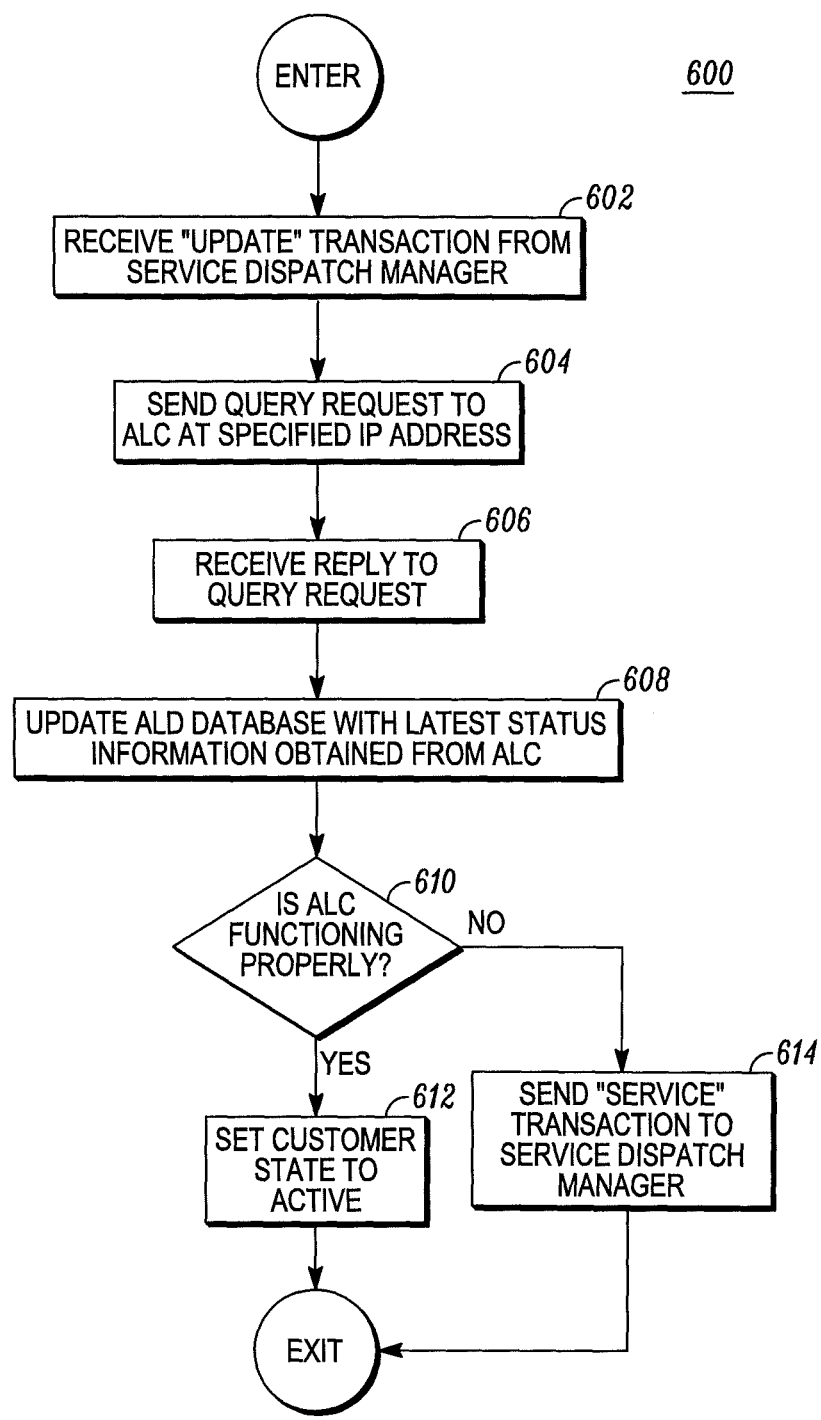
FIG. 5 is an operational flow diagram illustrating a method for activating new subscribers in an active power load management system in accordance with another exemplary embodiment of the present invention.

FIG. 5 illustrates an exemplary operational flow diagram 600 providing steps executed by the ALD 100 (e.g., as part of the ALC manager 108) or an alternative system controller to confirm customer sign-up to the ALMS 10, in accordance with another embodiment of the present invention. The steps of FIG. 5 are preferably implemented as a set of computer instructions (software) stored in a memory of the ALD 100 and executed by one or more processors 160 of the ALD 100. In accordance with the logic flow, the ALC manager 108 receives (602) an "Update" or similar transaction message or command from the service dispatch manager 126 and uses the IP address specified in the "Update" message to send (604) a "Query Request" or similar message or command to the active load client 300. The "Query Request" message includes a list of devices the ALD 100 expects to be managed. If the customer information input at customer sign-up includes temperature set points for one or more environmentally-dependent devices, that information is included in the "Query Request" message. The ALC manager 108 receives (606) a query reply containing information about the active load client 300 (e.g., current wireless band and/or protocol being used, operational state (e.g., functioning or not), setting of all the counters for measuring current usage (e.g., all are set to zero at initial set up time), and/or status of devices being controlled (e.g., either switched to the "on" state or "off" state)). The ALC manager 108 updates (608) the ALD database 124 with the latest status information obtained from the active load client 300. If the ALC manager 108 detects (610), from the query reply, that the active load client 300 is functioning properly, it sets (612) the customer state to "active" to allow participation in ALD activities. However, if the ALC manager 108 detects (610) that the active load client 300 is not functioning properly, it sends (614) a "Service" or similar transaction message or command to the service dispatch manager 126.

Figure 6:
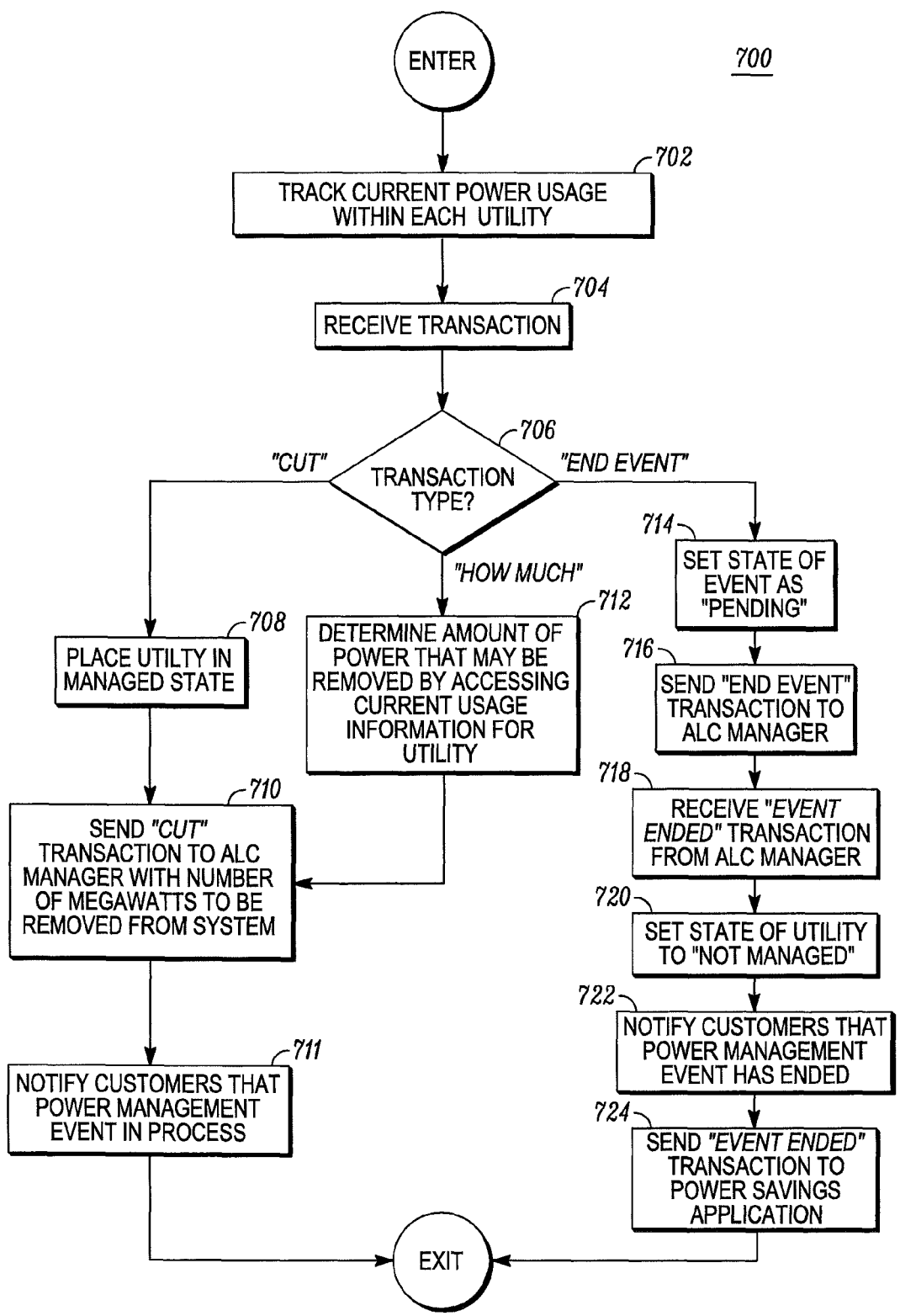
FIG. 6 is an operational flow diagram illustrating a method for managing events occurring in an active power load management system in accordance with yet another exemplary embodiment of the present invention.

FIG. 6 illustrates an exemplary operational flow diagram 700 providing steps executed by the ALD 100 (e.g., as part of the master event manager 106) or an alternative system controller to manage events in the exemplary ALMS 10, in accordance with another embodiment of the present invention. The steps of FIG. 6 are preferably implemented as a set of computer instructions (software) stored in a memory of the ALD 100 and executed by one or more processors 160 of the ALD server. Pursuant to the logic flow, the master event manager 106 tracks (702) current power usage within each utility being managed by the ALD 100. When the master event manager 106 receives (704) a transaction message or command from the UCC command processor 104 or the ALC manager 108, the master event manager 106 determines (706) the type of transaction received. Upon receiving a "Cut" transaction from the UCC command processor 104 (resulting from a "Cut" command issued by the utility control center 200), the master event manager 106 places (708) the utility in a managed logical state. The master event manager then sends (710) a "Cut" transaction or event message or command to the ALC manager 108 identifying the amount of power (e.g., in megawatts or megawatt-hours) that must be removed from the power system supplied by the utility. The amount of power specified for reduction in a "Cut" command may be an instantaneous amount of power or an average amount of power per unit time. Finally, the master event manager 106 notifies (711) every customer that has chosen to receive a notification (e.g., through transmission of an email or other pre-established notification technique) that a power control event is in process.

Returning to block 706, when the master event manager 106 receives a "How Much" or other equivalent power inquiry transaction message or command from the UCC command processor 104 (resulting from a "How Much" or equivalent power inquiry command issued by the utility control center 200), the master event manager 106 determines (712) the amount of power that may be temporarily removed from a particular utility's managed system by accessing the current usage information for that utility. The current usage information is derived, in one embodiment, by aggregating the total available load for the serving utility, as determined from the customer usage information for the utility stored in the ALD database 124, based on the total amount of power that may have to be supplied to the utility's customers in view of the statuses of each of the active load clients 300 and their respectively controllable devices 402-412, 60, 460 during the load control interval identified in the "How Much" message.

Each utility may indicate a maximum amount of power or maximum percentage of power to be reduced during any power reduction event. Such maximums or limits may be stored in the utility power and carbon database 134 of the ALD 100 and downloaded to the master event manager 106. In one embodiment, the master event manager 106 is programmed to remove a default one percent (1%) of the utility's current power consumption during any particular power management period (e.g., one hour). In alternative embodiments, the master event manager 106 may be programmed to remove other fixed percentages of current power consumption or varying percentages of current power consumption based on the current power consumption (e.g., 1% when power consumption is at system maximum and 10% when power consumption is at only 50% of system maximum). Based on the amount of power to be removed, the master event manager 106 sends (710) a "Cut" or equivalent event message to the ALC manager 108 indicating the amount of power (e.g., in megawatts or megawatt-hours) that must be removed from the utility's power system (e.g., 1% of the current usage), and notifies (711) all customers that have chosen to receive a notification that a power control event is in process. The master event manager 106 also sends a response to the utility control center 200 via the UCC command processor 104 advising the utility control center 200 as to the quantity of power that can be temporarily reduced by the requesting utility.

Returning once again to block 706, when the master event manager 106 receives an "End Event" or equivalent transaction message or command from the UCC command processor 104 (resulting from an "End Event" command issued by the utility control center 200), the master event manager 106 sets (714) the state of the current event as "Pending" and sends (716) an "End Event" or equivalent transaction message or command to the ALC manager 108. When the ALC manager 108 has performed the steps necessary to end the present event (e.g., a power reduction or Cut event), the master event manager 106 receives (718) an "Event Ended" or equivalent transaction from the ALC manager 108 and sets (720) the utility to a logical "Not Managed" state. The master event manager 106 then notifies (722) each customer that has chosen to receive a notification (e.g., through transmission of an email or other pre-established notification mechanism) that the power control event has ended. Finally, the master event manager 106 sends an "Event Ended" or equivalent transaction message or command to the power savings application 120 and the utility control center 200 (via the UCC command processor 104).

Figure 7:
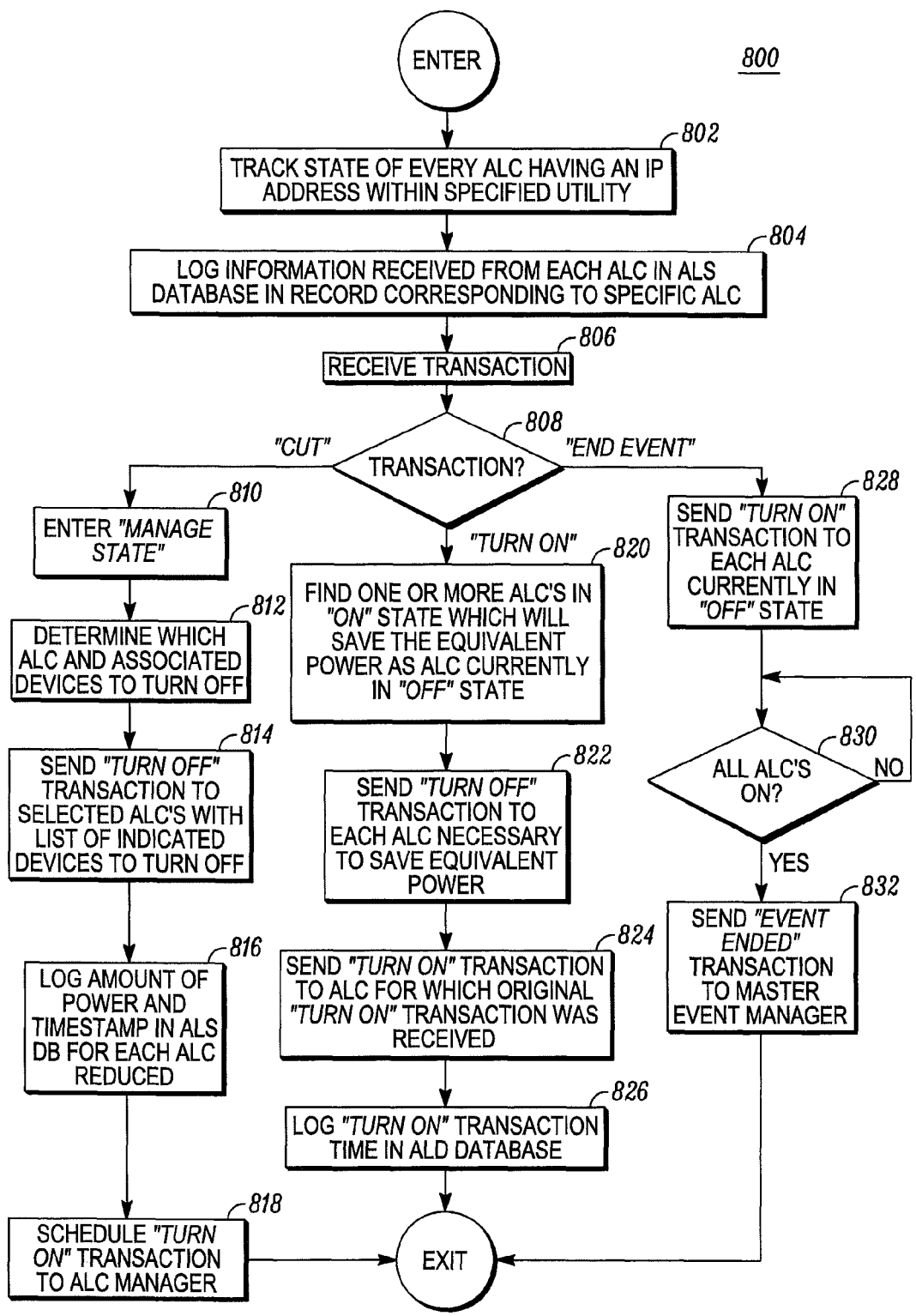
FIG. 7 is an operational flow diagram illustrating a method for actively reducing consumed power and tracking power savings on an individual customer basis in an active power load management system in accordance with another exemplary embodiment of the present invention.

Turning now to FIG. 7, exemplary operational flow diagram 800 illustrates steps executed by the ALD 100 (e.g., as part of the ALC manager 108) or an alternative system controller to manage power consumption in the exemplary ALMS 10, in accordance with a further embodiment of the present invention. The steps of FIG. 7 are preferably implemented as a set of computer instructions (software) stored in a memory of the ALD 100 and executed by one or more processors 160 of the ALD 100. In accordance with the logic flow, the ALC manager 108 tracks (802) the state of each managed active load client 300 by regularly receiving status or other messages (e.g., periodically or responsive to polls issued by the ALC manager 108) from every active load client 300 managed by the ALC manager 108. The status messages indicate the present states of the active load clients 300 and may include the present consumption of power for or through each device 402-412, 60 controlled by the active load client 300 (or the total power consumption for or through all devices 402-412, 60 controlled by the active load client 300 if individual device metering is not available) and the status of each device 402-412, 60 (e.g., either "Off" or "On"). The ALC manager 108 stores or logs (804) the power consumption and device status information in the ALD database 124 in a record corresponding to the specified active load client 300 and its associated customer and serving utility.

When the ALC manager 108 receives (806) a transaction message from the master event manager 106, the ALC manager 108 first determines (808) the type of transaction received. If the ALC manager 108 receives a "Cut" or equivalent transaction message or command from the master event manager 106, the ALC manager 108 enters (810) a "Manage" logical state. The ALC manager 108 then determines (812) which active load clients 300 and associated devices 402-412, 60 receiving power from the utility specified in the "Cut" message to switch to the "Off" state. If a location (e.g., list of GPS coordinates, a GPS coordinate range, a geographic area, or a power grid reference area) is included in the "Cut" transaction message, only those active load clients 300 within the specified location are selected for switching to the "Off" state. In other words, the ALC manager 108 may select a group of active load client devices 300 to which the issue a "Turn Off" transaction message based at least partially on the geographic location of each active load client 300 as such location relates to any location identified in the received "Cut" transaction message. The ALD database 124 contains information on the present power consumption (and/or the average power consumption) for or through each device 402-412, 60 connected to each active load client 300 in the ALMS 10. The ALC manager 108 utilizes the stored power consumption information to determine how many, and to select which, devices 402-412, 60 to turn off to achieve the power reduction required by the "Cut" message. The ALC manager 108 then sends (814) a "Turn Off" or equivalent transaction message or command to each active load client 300, along with a list of the devices to be turned off and a "change state to off" indication for each device 402-412, 60 in the list. The ALC manager 108 then logs (816) the amount of power (either actual or average), as determined from the ALD database 124, saved for each active load client 300, along with a time stamp indicating when the power was reduced. The ALC manager 108 then schedules (818) transactions for itself to "Turn On" each turned-off device after a predetermined period of time (e.g., which may have been set from a utility specified default, set by instructions from the customer (e.g., through customer personal settings 138), or otherwise programmed into the ALC manager 108).

Returning back to block 808, when the ALC manager 108 receives a "Turn On" or equivalent transaction message or command from the master event manager 106 for a specified active load client 300, and the ALC manager's state is currently in a "Manage" state, the ALC manager 108 finds (820) one or more active load clients 300 that are in the "On" state and do not have any or all of their managed devices 402-412, 60 turned off (and are in the specified location if so required by the original "Cut" transaction message), which, when one or more of such devices 402-412, 60 are turned off, will save the same or substantially the same amount of power that is presently being saved by the specified active load clients 300 that are in the "Off" state. Upon identifying new active load clients 300 from which to save power, the ALC manager 108 sends (822) a "Turn Off" or equivalent transaction message or command to each active load client 300 that must be turned off in order to save or curtail the same amount of power as the active load client(s) 300 to be turned on (i.e., to have its or their managed devices 402-412, 60 turned on) or to save an otherwise acceptable amount of power (e.g., a portion of the power previously saved or curtailed by the active load client(s) 300 to be turned back on). The ALC manager 108 also sends (824) a "Turn On" or equivalent transaction message or command to each active load client 300 to be turned back on. The "Turn On" message instructs all active load clients 300 to which the message was directed to turn on some or all devices that had been turned off, and causes the affected active load clients 300 to instruct their devices 402-412, 60 to enable the flow of electric power to their associated power consuming devices (e.g., appliance, HVAC unit, and so forth). Finally, the ALC manager 108 logs (826) the time that the "Turn On" transaction message is sent in the ALD database 124.

Returning once again to block 808, when the ALC manager 108 receives an "End Event" or equivalent transaction message or command from the master event manager 106, the ALC manager 108 sends (828) a "Turn On" or equivalent transaction message or command to every active load client 300 which is currently in the "Off" state and is served by the serving utility identified in the "End Event" message or to which the "End Event" message relates. Upon determining (830) that all the appropriate active load clients 300 have transitioned to the "On" state, the ALC manager 108 sends (832) an "Event Ended" or equivalent transaction message or command to the master event manager 106.

Figure 8:
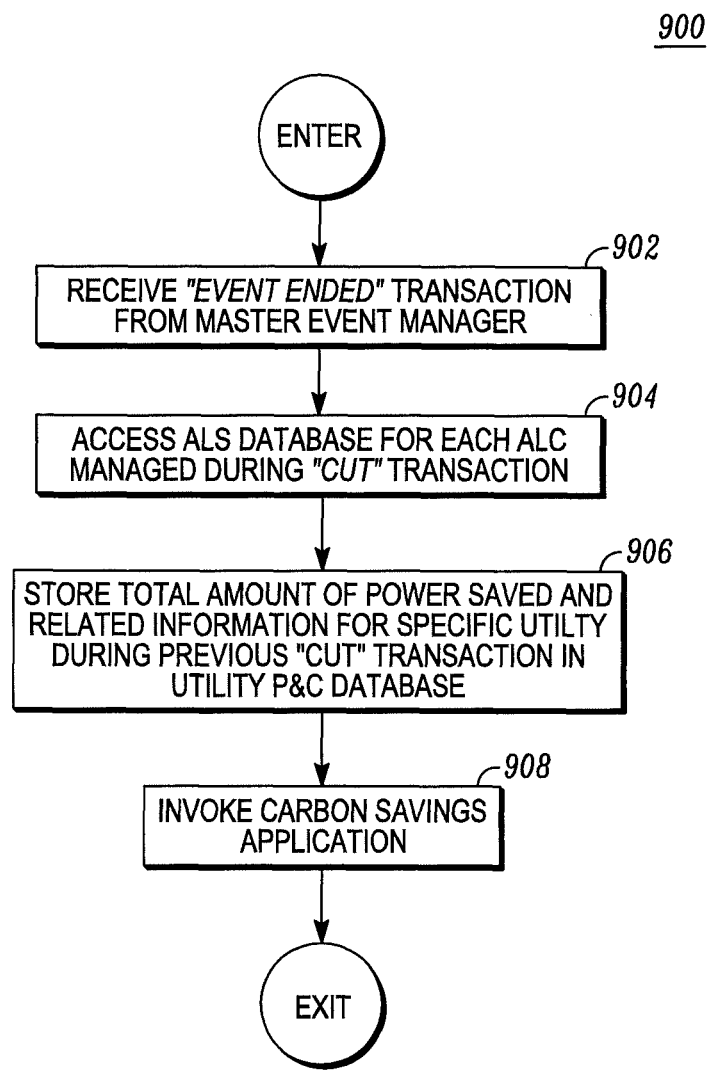
FIG. 8 is an operational flow diagram illustrating a method for tracking cumulative power savings of an electric utility in an active power load management system during a power reduction event in accordance with yet another exemplary embodiment of the present invention.

Referring now to FIG. 8, exemplary operational flow diagram 900 illustrates steps executed by the ALD 100 (e.g., through operation of the power savings application 120) or an alternative system controller to calculate and allocate power savings in the ALMS 10, in accordance with another embodiment of the present invention. The power savings application 120 calculates the total amount of power saved by each utility for each "Cut" event and the amount of power saved by each customer possessing an active load client 300.

According to the logic flow of FIG. 8, the power savings application 120 receives (902) an "Event Ended" or equivalent transaction message or command from the master event manager 106 each time a "Cut" or power savings event has ended. The power savings application 120 then accesses (904) the ALD database 124 for each active load client 300 involved in the "Cut" event. The database record for each active load client 300 contains the actual amount (or average amount) of power that would have been used by the active load client 300 during the last "Cut" event, along with the amount of time that each device 402-412, 60 associated with the active load client 300 was turned off. The power savings application 120 uses this information to calculate the amount of power (e.g., in megawatts per hour or megawatt-hours) that was saved for each active load client 300. The total power savings for each active load client 300 is stored in its corresponding entry in the ALD database 124. A running total of power saved is kept for each "Cut" transaction. Each utility that is served by the ALD 100 has an entry in the utility P&C database 134. The power savings application 120 stores (906) the total amount of power (e.g., in megawatts per hour or megawatt-hours) saved for the specific utility in the utility's corresponding entry in the utility P&C database 134, along with other information related to the power reduction or savings event (e.g., the time duration of the event, the number of active load clients 300 required to reach the power savings, average length of time each device 402-412, 60 was in the off state, plus any other information that would be useful in fine tuning future events and in improving customer experience). When all active load client entries have been processed, the power savings application 120 optionally invokes (908) the carbon savings application 132 or, analogously, a sulfur dioxide savings application, a nitrogen dioxide savings application, or a savings application for any other gaseous emissions, to correlate the power savings with carbon credits, sulfur dioxide credits, nitrogen dioxide credits, or any other gaseous emissions-based credits, respectively, based on a variety of factors as detailed in U.S. Patent Application Publication No. US 20100235008. The determined credits may be stored on a per customer and/or per utility basis.

Figure 9:
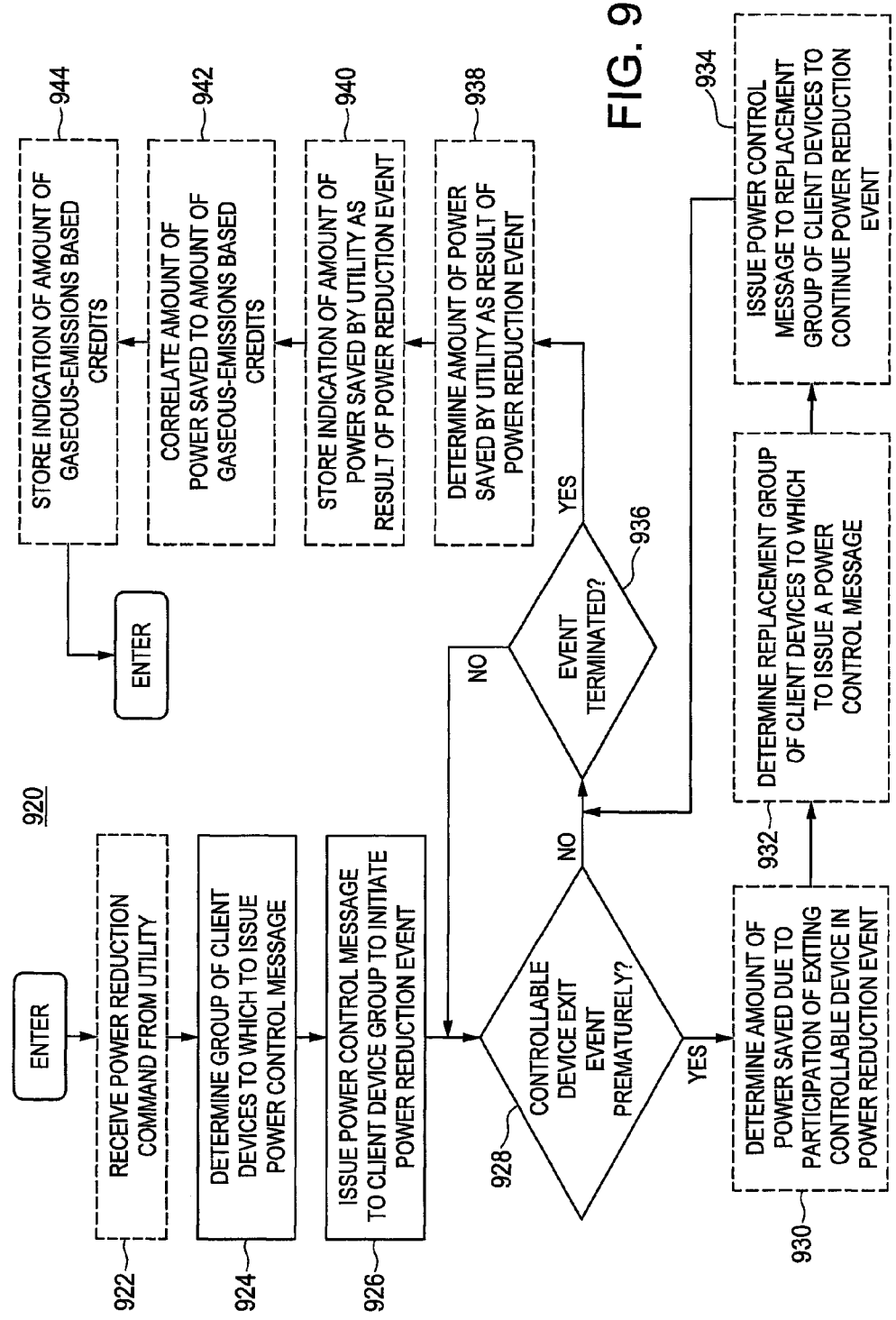
FIG. 9 is an operational flow diagram illustrating a method for a system controller to manage a flow of power supplied by an electric utility to a plurality of power consuming devices in accordance with another exemplary embodiment of the present invention.

FIG. 9 is an operational flow diagram 920 illustrating a method for a system controller, such as the ALD 100, to manage a flow of power supplied by an electric utility to a plurality of power consuming devices in accordance with another exemplary embodiment of the present invention. The steps of FIG. 9 are preferably implemented as a set of computer instructions (software) stored in a memory of the system controller and executed by one or more processors of the system controller (e.g., processor 160 of the ALD 100). In such an embodiment, the software functions to implement many of the logical elements of the system controller, including, but not limited to, the UCC command processor 104, the master event manager 106, the ALC manager 108, the ALC interface 112, the web browser interface 114, the power savings application 120, and the carbon savings application 132 where the system controller is implemented as an ALD 100.

In accordance with the logic flow, the system controller (e.g., via its UCC command processor 104) optionally receives (922) a power control command from the electric utility control center 200. The power control command requires a reduction in an amount of electric power consumed by power consuming devices within the utility service area or areas being managed by the system controller. As discussed above with respect to FIG. 2, the power control command may be a "Cut" command that specifies an amount of power to be curtailed or reduced by the system controller. Responsive to the power control command or independent of the power control command (e.g., such as when the system controller is implementing a virtual utility or is otherwise managing power flow without stimulus from outside the ALMS 10), the system controller determines (924) a group of one or more client devices or other local controllers to which to issue a power control message seeking a reduction in power consumed by power consuming devices located at service points 20 managed locally by the group of client devices. The power control message indicates an amount of electric power to be reduced and/or the identification(s) of one or more controllable devices to be instructed to disable a flow of electric power to associated power consuming devices. For example, a power control message may instruct a client device to curtail a particular amount of power (e.g., 2500 watt-hours or any other amount as desired), disable a flow of power to one or more particular devices (e.g., a smart breaker 402-412 or a smart appliance 60 (which includes a control component of a power consuming device, such as a thermostat of an HVAC unit 50)), or both. As described above with respect to FIG. 3, each client device (e.g., active load client 300) controls one or more controllable devices (e.g., devices 402-412, 60), which in turn selectively enables and disables a flow of electric power to one or more power consuming devices (e.g., devices 30, 40, 50, 60, 70). Where the power control message identifies one or more specific controllable devices, the system controller determines the controllable devices to be identified in the power control message by querying a database (e.g., the ALD database 124) prior to communication of the power control message to the group of client devices.

After determining the group of client devices to which to send power control messages, the system controller issues (926) (i.e., generates and sends) one or more power control messages to the group of client devices to initiate a power reduction control event (which may have been self-initiated or prompted by a power control command from an electric utility). The power control message may be a "Turn Off" transaction message, as described above, or any other appropriate message communicated from the ALC manager 108 to the determined group of client devices. The power control message essentially instructs the group of client devices to turn off power to one or more power consuming devices located at the service points 20. A single message may be sent to all client devices in the group or individual messages may be sent to each client device where the group of client devices includes more than one device.

Subsequent to initiation of the power reduction event, the system controller determines (928) whether at least one controllable device has prematurely exited the power reduction event. The system controller (and, in particular, the ALC manager 108) may determine that a controllable device has prematurely exited the power reduction event in a variety of ways. For example, the system controller may receive a status message from a client device including information to indicate that the controllable device has prematurely exited the event. Thus, the status message may identify the controllable device, or a power consuming device controlled by the controllable device, that has exited the event. Alternatively or additionally, the status message may include an amount of power that is no longer being curtailed as a result of the controllable device's exit from the event. The status message may be received responsive to user adjustment of the controllable device that prematurely exited the power reduction event or user adjustment of a power consuming device controlled by the prematurely-exiting controllable device. In such a case, the client device detects user adjustment of the controllable device or the power consuming device and sends the status message to the system controller. For example, the status message may be sent to and received by the system controller in response to a user's adjustment of a thermostat of an HVAC system 50 during a power reduction event. In this case, the status message may be triggered by an increasing temperature adjustment when the HVAC system 50 is in a heating mode, a decreasing temperature adjustment when the HVAC system 50 is in a cooling mode, or removal of the HVAC system 50 from an automatic (AUTO) setting in either cooling or heating mode. Alternatively, the status message may be sent to and received by the system controller in response to a user's adjustment (e.g., closing) of a smart breaker 402-412 after the smart breaker 402-412 had been electronically opened responsive to initiation of the power reduction control event.

Besides receiving a status message from a client device, the system controller may determine (928) that a controllable device has prematurely exited the power reduction event by receiving an override request to terminate the power reduction control event with respect to the controllable device or one or more of the power consuming devices under the controllable device's control. In other words, the override request may seek to withdraw one or more devices from an ongoing control event. The override request may alternatively request that the control event be terminated with respect to all devices at a particular service point 20 (i.e., with respect to an entire service point 20). The override request may be received at the system controller through an Internet-based interface 114 of the controller, such as via the customer dashboard 98. Responsive to an override request, the system controller may transmit a second power control message to the client device which controls the prematurely-exiting controllable device, wherein the second message instructs the client device to turn on or enable a flow of electric power to the previously turned off power consuming device or devices under control of the prematurely-exiting controllable device. The system controller may then determine the amount of power saved as a result of the power reduction control event and the quantity of carbon or other gaseous-emissions based credits associated with the service point 20 taking into account the early termination of the control event, as discussed in more detail below with respect to blocks 938 through 944.

When the system controller determines (928) that a controllable device has exited the power reduction control event prematurely, the system controller may continue the control event without taking any further action, thereby reducing the overall power savings or curtailment provided by the event, or may take other action to try to replace the power savings lost by the premature exiting of the controllable device. In one optional embodiment in which the system controller takes action to replace at least some of the power savings lost by the premature exiting of the controllable device, the system controller determines (930) an amount of power saved due to participation of the prematurely-exiting controllable device in the power reduction event. For example, the system controller may retrieve power consumption data for the exiting controllable device or the power consuming devices under its control from a database (e.g., the ALD database 124) and compute an estimated amount of power that would be saved if the exiting controllable device continued its participation in the power reduction event. The database 124 may include a variety of power consumption data, including data categorized by time of day, day of the week, day of the month, and so forth to enable the system controller to accurately determine the impact on power savings resulting from the controllable device's premature exit from the power reduction event. As described above, the system controller (e.g., the ALD 100) regularly receives power consumption information for devices (e.g., devices 30, 40, 50, 60, 70, 402-412) from client devices (e.g., active load clients 300) located at utility service points 20 during operation of the ALMS 10.

After determining the estimated amount of power that would be saved if the exiting controllable device continued its participation in the power reduction event, the system controller determines (932) a replacement group of one or more client devices to which to issue a power control message. As discussed above with respect to block 924, the power control message seeks a reduction in power consumed by devices located at service points 20 managed by the replacement group of client devices. The power control message indicates an amount of electric power to be reduced and/or the identification(s) of one or more controllable devices to be instructed to disable a flow of electric power to associated power consuming devices. For example, the power control message to a replacement client device may instruct a client device to curtail a particular amount of power, disable a flow of power to one or more particular controllable devices (e.g., a smart breaker 402-412 or a smart appliance 60), or both. In this embodiment, the group of replacement client devices is selected such that the amount of electric power consumed by one or more devices managed by the group of replacement client devices is at least a portion of an amount of power to be consumed by the power consuming device or devices controlled by the exiting controllable device after a flow of power is enabled to the power consuming device or devices. In other words, the system controller selects the replacement group of client devices based on the group's potential to save or curtail substantially the same amount of power as was saved by the exiting controllable device during its participation in the power reduction event or as would be expected to be saved if the exiting controllable device continued its participation in the power reduction event. Thus, the replacement group of client devices may be determined such that the group controls one or more controllable devices that are operable to selectively enable and disable a flow of electric power to power consuming devices, such that the controlled flow of electric power is a least a portion, and more preferably substantially the same as, the amount of power expected to be consumed by the power consuming device or devices under the control of the exiting controllable device.

In one exemplary embodiment, the replacement group of client devices is chosen such that the controllable devices under the replacement group's control are not disabling or curtailing a flow of electric power to any power consuming devices at the time at which the replacement group of client devices is determined. In such an embodiment, the replacement group of client devices would exclude the client device controlling the exiting controllable device. Alternatively, the replacement group of client devices may be chosen such that at least some of the controllable devices under the replacement group's control are disabling or curtailing a flow of electric power to one or more power consuming devices at the time at which the replacement group of client devices is determined. In such a case, replacement client devices which are already involved in the ongoing control event have additional capacity for shedding load or power consumption. Where the client device controlling the exiting controllable device has additional load-shedding capability, the client device may form part of the replacement group of client devices or may even be the sole replacement client device of the group (e.g., where the replacement group includes a single client device).

Once the replacement group of client devices is determined, the system controller issues (934) a power reduction control message to the replacement group of client devices to continue the power reduction event. After the system controller issues the power control message to the replacement group of client devices or when no controllable devices have prematurely exited the power reduction control event, the system controller determines (936) whether the control event has terminated. The system controller may determine that the control event has terminated upon receiving a termination command, such as an "End Event" command, from the utility control center 200, upon determining that the control event has met its objective (e.g., to curtail a predetermined amount of power for a predetermined period of time), or a time duration associated with the control event has expired. If the control event has not terminated, the system controller continues to assess whether any controllable devices, client devices, or power consuming devices have prematurely exited the control event.

If the control event has terminated, the system controller may optionally determine (938) an amount of power saved by the utility (and optionally by the customers whose service points 20 participated in the event) as a result of the power reduction control event. The power savings may be determined on a utility basis and/or on a customer-by-customer basis taking into account power savings reductions at those customer service points 20 at which controllable devices prematurely-exited the control event. If replacement control devices were employed to overcome the entire loss in power savings (and associated increase in power consumption) resulting from premature exiting of one or more controllable devices from the control event, the net lost power savings by the utility would be zero. However, if no replacement control devices were employed or the employed replacement control devices were unable to overcome the entire loss in power savings resulting from premature exiting of one or more controllable devices from the control event, the utility may have incurred a reduction in power savings or may not have saved as much power as originally anticipated due to the premature exit from the control event by the controllable device or devices. After the amount of power saved as a result of the power reduction event has been determined, the system controller stores (940) an indication of the amount of power saved by the utility and/or on a customer-by-customer basis in a database (e.g., in the ALD database 124 and/or the utility power and carbon database 134).

In addition to determining the amount of power saved as a result of the control event, the system controller may optionally correlate (942) the amount of power saved to an amount of gaseous-based emissions credits, such as carbon credits using the carbon savings application 132 described above. The determination of gaseous-based emissions credits may be performed for the utility and/or on a customer-by-customer basis. The system controller stores (944) an indication of the amount of gaseous-based emissions credits in a database for the utility and/or for each customer. The credits may then be sold or exchanged on an appropriate exchange by their respective owners.

Figure 10:
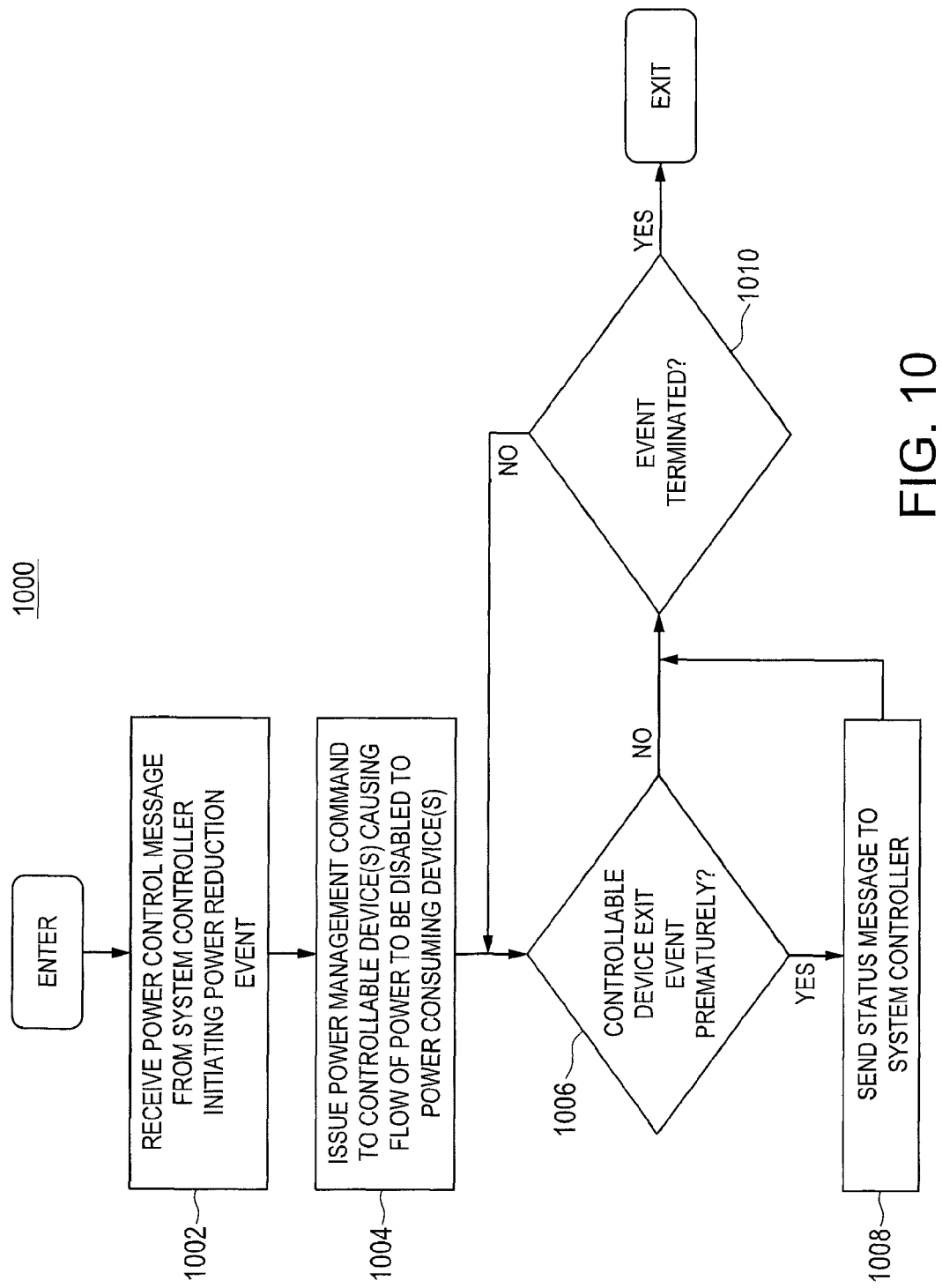
FIG. 10 is an operational flow diagram illustrating a method for a client device to manage a flow of power supplied by an electric utility to a plurality of power consuming devices located at a customer service point at which the client device is also located, in accordance with a further exemplary embodiment of the present invention.

FIG. 10 is an operational flow diagram 1000 illustrating a method for a client device (or equivalent local controller) to manage a flow of power supplied by an electric utility to a plurality of power consuming devices located at a customer service point at which the client device is also located, in accordance with a further exemplary embodiment of the present invention. The steps of FIG. 10 are preferably implemented as a set of computer instructions (software) stored in a memory of the client device (e.g., an active load client 300) or equivalent local controller and executed by one or more processors of the client device. In such an embodiment, the software functions to implement many of the logical elements of the client device, including, but not limited to, the communication protocol stack 308-312, the device control manager 314, the smart device interface 324, the smart breaker controller 306, and the event scheduler 344 where the client device/local controller is implemented as an active load client 300.

In accordance with the logic flow, the client device receives (1002) a power control message from a system controller, such as the ALD 100 or another centralized controller, initiating a power reduction control event. In an embodiment in which the client device is an active load client 300, the power control message may be received via the communications interface 308, the IP router 320, the security interface 310, and the IP-based communication converter 312, and passed to the event scheduler 344 to schedule the requested control event with the device control manager 314. The power control message may indicate an amount of electric power to be reduced and/or may identify one or more controllable devices to be instructed to disable a flow of electric power to one or more associated power consuming devices. For example, the power control message may generally indicate an amount of power expected to be reduced by the client device at the service point, may specifically identify one or more controllable devices (e.g., smart breakers, smart appliance controllers, addressable thermostats, and so forth) to which the client device must send instructions to disable a flow of power to their associated power consuming devices (e.g., HVAC system, lighting, appliance, etc.), or both. Responsive to the power control message, the client device issues (1004) or communicates a respective power management command to one or more controllable devices instructing the controllable device or devices to disable a flow of electric power to one or more associated power consuming devices. The controllable device or devices to which the power management command is sent may have been identified in the power control message received from the system controller. Alternatively, the client device may have unilaterally determined which controllable device or devices to which to send the power management command based on the amount of power to be reduced as indicated in the power control message, the amount of power consumed by controlled power consuming devices at the service point 20 (e.g., as may be stored locally or received from the system controller), and a mapping of the controllable devices to the power consuming devices (e.g., as also may be stored locally or received from the system controller).

Subsequent to issuing a power management command to a controllable device, the client device determines (1006) whether the controllable device has prematurely exited the power reduction control event and enabled a flow of electric power to an associated power consuming device. For example, where the client device is an active load client 300, the determination of whether a controllable device has prematurely exited the power reduction control event may be made by the device control manager 314 responsive to signaling from the smart device interface 324, the smart breaker controller 306, or another appropriate interface coupled between the device control manager 314 and the prematurely-exiting controllable device, as applicable. The client device may determine that a controllable device has exited the control event prematurely by determining that the controllable device has been adjusted by a user so as to enable electric power to flow to an associated power consuming device when such flow of power should have been disabled by the issuance of the power management command. For example, where the controllable device is a thermostat of an HVAC system, the client device may determine that the thermostat has exited the control event upon detecting that the thermostat temperature has been adjusted by the user during the control event such that power is allowed to flow to the main power consuming devices of the HVAC system (e.g., the air handler and the compressor). Alternatively, where the controllable device is a smart breaker, the client device may determine that the breaker has exited the control event upon detecting that the breaker has been closed by a user after it had been opened in response to the power management command. Still further, the client device may determine that the controllable device has exited the control event responsive to receiving another power control message from the system controller instructing the client device to remove the controllable device from the control event prior to termination of the control event. A controllable device removal or exit instruction may be received subsequent to a customer's request to override the control event. In this case, the client device may transmit a new power management command to the prematurely-exiting controllable device instructing the controllable device to restart the flow of electric power to its associated power consuming device or devices.

Upon determining that a controllable device has exited the power reduction control event prematurely, the client device sends (1008) a status message to the system controller informing the system controller that the controllable device has exited the control event. For example, where the client device is an active load client 300, the status message may be generated by the device control manager 314 or the event scheduler 344 after the device control manager 314 has determined that the controllable device has exited the control event. The status message informs the system controller that the controllable device has exited the control event and allows the system controller to take the power consumption resulting from the premature exiting of the controllable device into account when optionally determining power savings and gaseous emissions-based credits. The system controller may also use the status message as a trigger to find one or more replacement controllable devices to add to the control event in an attempt to maintain a desired level of power savings or curtailment. When the system controller has notified the client device that the controllable device is exiting the control event in response to a customer override request, the status message may serve as an acknowledgement or confirmation that the client device has received the notice and removed the controllable device from the control event.

When the client device has not determined that a controllable device has exited the control event prematurely or after the client device has sent a status message to the system controller advising that a controllable device has exited the control event prematurely, the client device determines (1010) whether the control event has terminated. Such a determination may be made in response to receiving a power control message from the system controller terminating the control event and/or instructing the client device to enable all of its disabled power consuming devices (e.g., a "Turn On" message). If the control event has not ended, the client device continues to monitor for premature exiting of controllable devices until the control event ends.

As described above, the present invention encompasses a method and apparatus for managing and distributing power within a power management system based on real-time feedback from addressable and remotely controllable devices, wherein the feedback includes the actual amount of power currently being individually or collectively consumed by the devices or by other devices which they control. With this invention, a power management system may initiate control events to disable power to devices within the system in order to save a desired amount of power and may be further configured to detect when one or more of the devices prematurely exits a control event (e.g., due to a customer override). Responsive to determining that a device has prematurely exited a control event, the system may take corrective action to replace the exited device with one or more new devices to continue the control event and maintain the desired level of power savings.

In the foregoing specification, the present invention has been described with reference to specific embodiments. However, one of ordinary skill in the art will appreciate that various modifications and changes may be made without departing from the spirit and scope of the present invention as set forth in the appended claims. For example, the ALD 100 may be replaced by any centralized or distributed processor or processing arrangement that is communicatively coupled to active load clients 300 or other two-way reporting devices distributed throughout the service area of a utility. Additionally, when implementing an energy conservation program for a customer, a control event or "Cut" message communicated from the ALD 100 to the active load client 300 may include program details or other control information (e.g., times and durations for control events, times for reporting amounts of saved energy, and so forth) sufficient to enable the active load client 300 to automatically execute the energy program at the service point 20 with little to no additional input from the ALD 100. Further, the functions of specific modules within the ALD 100, the active load client 300, and/or a virtual electric utility may be performed by one or more equivalent means implemented in hardware or software (including firmware and middleware). Additionally, although the logic flow diagrams 500, 600, 700, 800, 900, 920, 1000 illustrate exemplary orders or arrangements of steps for carrying out various embodiments of the present invention, those of ordinary skill in the art will readily recognize and appreciate that many, if not all, of the steps in the logic flows may occur in different orders and still attain the benefits and advantages of the present invention. Therefore, the orders of steps as illustrated in FIGS. 4-10 should not be construed to limit the scope of the appended claims. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, and solutions to problems, as well as any element(s) that may cause or result in such benefits, advantages, or solutions to become more pronounced, are not to be construed as critical, required, or essential features or elements of any or all of the claims. The invention is defined solely by the appended claims including any amendments made during the pendency of this application and all equivalents of those claims as issued.

What is claimed is:

1. A method for managing a flow of power supplied by an electric utility to a plurality of power consuming devices, the plurality of power consuming devices being located at one or more service points to which electrical power is supplied by the electric utility, the method comprising:

determining a group of one or more client devices to which to communicate a power control message, each client device of the group of client devices controlling at least one controllable device, each controllable device controlling a flow of electric power to at least one power consuming device of the plurality of power consuming devices, the power control message indicating at least one of an amount of electric power to be reduced and an identification of one or more controllable devices to be instructed to disable a flow of electric power to one or more associated power consuming devices;

communicating the power control message to the group of client devices to initiate a power reduction event; and subsequent to initiation of the power reduction event, determining that at least one controllable device has prematurely exited the power reduction event.

2. The method of claim 1, wherein determining that at least one controllable device has prematurely exited the power reduction event comprises receiving a status message from a client device of the group of client devices, wherein the status message indicates that a controllable device has exited the power reduction event.

3. The method of claim 2, wherein the status message was sent responsive to user adjustment of the controllable device that exited the power reduction event.

4. The method of claim 3, wherein the controllable device is a thermostat of an HVAC system and wherein the status message was sent responsive to user adjustment of the thermostat.

5. The method of claim 3, wherein the controllable device is a smart breaker, wherein the smart breaker was opened responsive to initiation of the power reduction event, and wherein the status message was sent responsive to closing of the smart breaker by a user.

6. The method of claim 1, wherein determining that at least one controllable device has prematurely exited the power reduction event comprises:

receiving, via an Internet-based interface, an override request input on behalf of a utility customer, the override request causing the power reduction event to terminate with respect to the at least one controllable device.

7. The method of claim 6, further comprising:

responsive to the override request, communicating a second power control message to one or more client devices controlling the at least one controllable device that has prematurely exited the power reduction event, the second power control message instructing the one or more client devices to enable a flow of electric power to one or more power consuming devices under control of the at least one controllable device that has prematurely exited the power reduction event.

8. The method of claim 1, further comprising:

receiving a power control command from the electric utility, the power control command requiring a reduction in an amount of electric power consumed by at least some of the power consuming devices;

wherein the group of client devices to which to communicate the power control message is determined responsive to the power control command.

9. The method of claim 1, further comprising:

determining an amount of power saved by the electric utility as a result of the power control message; and storing an indication of the amount of power saved by the electric utility.

10. The method of claim 9, further comprising:

correlating the amount of power saved to an amount of gaseous emissions-based credits; and storing an indication of the amount of gaseous emissions-based credits.

11. The method of claim 10, wherein the gaseous emissions-based credits are carbon credits.

12. The method of claim 1, further comprising:

determining a first amount of electric power that would have been saved due to continued participation in the power reduction event by the at least one controllable device that has prematurely exited the power reduction event;

determining a second group of one or more client devices to which to communicate a second power control message, the second group of client devices controlling one or more controllable devices that are operable to control a flow of a second amount of electric power to one or more power consuming devices of the plurality of power consuming devices, wherein the second amount of electric power is at least a portion of the first amount of electric power; and communicating the second power control message to the second group of client devices.

13. The method of claim 12, wherein the second amount of electric power is substantially the same as the first amount of electric power.

14. The method of claim 12, wherein the one or more controllable devices controlled by the second group of client devices are not disabling a flow of electric power to any power consuming devices at a time at which the second group of client devices is determined.

15. A method for managing a flow of power supplied by an electric utility to a plurality of power consuming devices, the plurality of power consuming devices being located at one or more service points to which electrical power is supplied by the electric utility, the method comprising:

receiving a power control message from a system controller, the power control message initiating a power reduction event and indicating at least one of an amount of electric power to be reduced and an identification of at least one controllable device to be instructed to disable a flow of electric power to one or more associated power consuming devices;

responsive to the power control message, issuing a power management command to one or more controllable devices, the power management command causing the one or more controllable devices to disable a flow of electric power to at least one associated power consuming device;

subsequent to issuing the power management command, determining that a controllable device has prematurely exited the power reduction event and enabled a flow of electric power to an associated power consuming device; and sending a status message to the system controller informing the system controller that the controllable device has exited the power reduction event.

16. The method of claim 15, wherein determining that a controllable device has prematurely exited the power reduction event comprises determining that a controllable device has been adjusted by a user so as to enable a flow of electric power to an associated power consuming device.

17. The method of clam 16, wherein the controllable device is a thermostat of an HVAC system and wherein determining that the controllable device has prematurely exited the power reduction event comprises determining that the thermostat has been adjusted by a user.

18. The method of clam 16, wherein the controllable device is a smart breaker and wherein determining that the controllable device has prematurely exited the power reduction event comprises determining that the smart breaker has been closed by a user.

19. The method of claim 15, wherein determining that a controllable device has prematurely exited the power reduction event comprises receiving a second control message from the system controller, the second control message including an instruction to remove the controllable device from the power reduction event.

20. A system for managing consumption of power supplied by at least one electric utility to a plurality of power consuming devices, wherein power flow to the plurality of power consuming devices is enabled and disabled by a plurality of controllable devices and wherein the plurality of controllable devices operate under the control of one or more client devices, the system comprising:

an event manager operable to maintain at least one power management status relating to each client device and generate power control event instructions to initiate and terminate power control events;

a database operable to store, on at least one of a per client device basis and a per electric utility basis, information relating to power consumed by the plurality of power consuming devices; and a client device manager operably coupled to the event manager and the database, the client device manager being operable to:

select from the database, based on the information stored in the database, at least one client device to which to communicate a power control message indicating at least one of an amount of electric power to be reduced and identification of at least one controllable device to be instructed to disable a flow of electric power to one or more associated power consuming devices responsive to receipt of a power control event instruction requiring a reduction in a specified amount of electric power, the power control event instruction initiating a power reduction event; and determine that at least one controllable device has prematurely exited the power reduction event subsequent to initiation of the power reduction event.

21. The system of claim 20, wherein the client device manager is operable to determine that at least one controllable device has prematurely exited the power reduction event by receiving a status message from a client device of the at least one client device, wherein the status message indicates that a controllable device has exited the power reduction event.

22. The system of claim 21, wherein the status message was sent responsive to user adjustment of the controllable device that exited the power reduction event.

23. The system of claim 22, wherein the controllable device is a thermostat of an HVAC system and wherein the status message was sent responsive to user adjustment of the thermostat.

24. The system of claim 22, wherein the controllable device is a smart breaker, wherein the smart breaker was opened responsive to initiation of the power reduction event, and wherein the status message was sent responsive to closing of the smart breaker by a user.

25. The system of claim 20, wherein the event manager is further operable to issue a second power control event instruction to the client device manager identifying one or more client devices to which to communicate a second power control message instructing the one or more client devices to enable a flow of electric power to at least one power consuming device that has a flow of electric power disabled, the second power control event instruction terminating the power reduction event with respect to the at least one power consuming device, and wherein the client device manager is further operable to:

determine, from the database, at least one replacement client device to which to communicate a third power control message indicating at least one replacement power consuming device to which to disable a flow of electric power, wherein an amount of electric power consumed by the at least one replacement power consuming device is at least a portion of an amount of power to be consumed by the at least one power consuming device after a flow of power is enabled to the at least one power consuming device;

send the second power control message to the one or more client devices to thereby enable a flow of power to the at least one power consuming device; and send the third power control message to the at least one replacement client device to initiate a power reduction event with respect to the at least one replacement client device and thereby disable a flow of electric power to the at least one replacement power consuming device.

26. The system of claim 25, wherein the amount of electric power consumed by the at least one replacement power consuming device prior to communication of the third power control message is substantially the same as the amount of power to be consumed by the at least one power consuming device after a flow of power is enabled to the at least one power consuming device.

27. The system of claim 25, wherein the at least one replacement client device does not control, prior to communication of the third power control message, any power consuming devices which have a flow of electric power disabled.

28. The system of claim 20, further comprising
a command processor operable to receive power control commands from the at least one electric utility and generate power control event messages responsive thereto, at least one of the power control commands requiring a reduction in an amount of electric power consumed by the plurality of power consuming devices.

29. The system of claim 20, further comprising:
the at least one client device to which the power control message is communicated.

30. A system for managing consumption of power supplied by at least one electric utility to a plurality of power consuming devices, wherein power flow to the plurality of power consuming devices is enabled and disabled by a plurality of controllable devices and wherein the plurality of controllable devices operate under the control of one or more client devices, the system comprising:
an event manager operable to maintain at least one power management status relating to each client device and generate power control event instructions to initiate and terminate power reduction events;
a database operable to store, on at least one of a per client device basis and a per electric utility basis, information relating to power consumed by the plurality of power consuming devices; and a client device manager operably coupled to the event manager and the database, the client device manager being operable to select from the database, based on the information stored in the database, at least one client device to which to communicate a power control message indicating at least one of an amount of electric power to be reduced and identification of at least one controllable device to be instructed to disable a flow of electric power to one or more associated power consuming devices responsive to receipt of a power control event instruction requiring a reduction in a specified amount of electric power, the power control event instruction initiating a power reduction event; and means, operably coupled to the event manager, for determining that at least one controllable device has prematurely exited the power reduction event subsequent to initiation of the power reduction event.

31. The system of claim 30, wherein the means for determining that at least one controllable device has prematurely exited the power reduction event comprises the client device manager and wherein the client device manager is further operable to receive a status message from a client device of the at least one client device, wherein the status message indicates that a controllable device has exited the power reduction event.

32. The system of claim 30, wherein the means for determining that at least one controllable device has prematurely exited the power reduction event comprises an Internet-based interface operable to receive an override request from a utility customer, the override request causing the power reduction event to terminate with respect to the at least one controllable device.

33. The system of claim 32, wherein the client device manager is further operable, responsive to the override request, to communicate a second power control message to one or more client devices controlling the at least one controllable device that has prematurely exited the power reduction event, the second control message instructing the one or more client devices to enable a flow of electric power to the at least one controllable device that has prematurely exited the power reduction event.

34. The system of claim 30, further comprising
a command processor operable to receive power control commands from the at least one electric utility and generate power control event messages responsive thereto, at least one of the power control commands requiring a reduction in an amount of electric power consumed by the plurality of power consuming devices.

\* \* \* \* \*